(12) United States Patent
Kha et al.

(10) Patent No.: US 6,752,665 B2
(45) Date of Patent: Jun. 22, 2004

(54) MODULAR CROSS-CONNECT WITH REMOVABLE SWITCH ASSEMBLY

(75) Inventors: Thong Binh Kha, Simi Valley, CA (US); Jeff Clarke Murphy, Winnetka, CA (US); Wayne A. Zahlit, Thousand Oaks, CA (US); Esfir Felman, Tarzana, CA (US)

(73) Assignee: Trompeter Electronics, Inc., Westlake Village, CA (US)

( * ) Notice: Subject to any disclaimer, the term of this patent is extended or adjusted under 35 U.S.C. 154(b) by 0 days.

(21) Appl. No.: 10/298,478

(22) Filed: Nov. 18, 2002

(65) Prior Publication Data

US 2004/0097138 A1 May 20, 2004

(51) Int. Cl.[7] ............................................. H01R 24/04
(52) U.S. Cl. ...................................................... 439/668
(58) Field of Search ................................. 439/688, 689, 439/188, 79, 80

(56) References Cited

U.S. PATENT DOCUMENTS

| | | |
|---|---|---|
| 4,002,399 A | 1/1977 | Dietch et al. |
| 4,017,770 A | 4/1977 | Valfre et al. |
| 4,106,841 A | 8/1978 | Vladic .......................... 439/188 |
| 4,213,013 A | 7/1980 | Perna et al. |
| 4,221,445 A | 9/1980 | Fleischhacker et al. |
| 4,312,552 A | 1/1982 | Hughes et al. |
| 4,423,466 A | 12/1983 | Beun ............................ 361/400 |
| 4,536,052 A | 8/1985 | Baker et al. |
| 4,595,799 A | 6/1986 | Krob et al. |
| 4,670,626 A | 6/1987 | Fisher et al. |
| 4,705,921 A | 11/1987 | Rabey et al. |
| 4,737,985 A | 4/1988 | De Luca et al. |
| 4,749,968 A | 6/1988 | Burroughs |

(List continued on next page.)

FOREIGN PATENT DOCUMENTS

| | | | |
|---|---|---|---|
| EP | 0 330 765 A2 | 12/1988 | |
| EP | 0 412 045 A2 | 5/1990 | |
| EP | 0 987 905 A2 | 9/1999 | |
| GB | 2 111 770 A | 7/1983 | ......... H01R/13/703 |
| WO | WO 96/38884 | 12/1996 | |
| WO | WO 98/38703 | 9/1998 | |

OTHER PUBLICATIONS

*DSX Digital Signal Cross–Connect*, Second Edition, ADC Telecommunications, ADC Telecommunications Inc., 1987, pp. 1–58, 65 and 77–88.

"*tini–telephone*" *and Standard Patching Systems & Components*, Switchcraft®, Switchcraft, Inc., 1985, pp. 43.80, 87–88.

*Primary Examiner*—Javaid H. Nasri
(74) *Attorney, Agent, or Firm*—Sterne, Kessler, Goldstein & Fox PLLC

(57) ABSTRACT

A modular cross-connect includes a chassis configured to receive a plurality of cross-connect modules therein and having a front face and a rear cover. A plurality of fixed portions of cross-connect modules are mounted in the chassis such that rear facing connectors of each of the fixed portions extend outward from the rear cover of the chassis. Each fixed portion has a front-facing connector configured to mate with a rear-facing connector of a corresponding removable portion of a cross-connect module. A plurality of reversible slots are formed in the chassis. Each slot is configured to receive a removable portion of a cross-connect module and to align a rear-facing connector of a removable portion of a cross-connect module for connection with a front-facing connector of a fixed portion of a cross-connect module. A plurality of doors are at the front face of the chassis, each door corresponding to one of the plurality of slots and being pivotally mounted for rotation about an axis parallel to a width of the chassis. Insertion of a removable portion of a cross-connect module into one of the plurality of slots causes a corresponding one of the plurality of doors to pivot about the axis to permit entry of the removable portion of the cross-connect module into the chassis.

54 Claims, 26 Drawing Sheets

U.S. PATENT DOCUMENTS

| | | | | |
|---|---|---|---|---|
| 4,768,961 | A | 9/1988 | Lau | 439/61 |
| 4,770,639 | A | 9/1988 | Lau | 439/61 |
| 4,772,562 | A | 9/1988 | Lau | 439/368 |
| 4,773,867 | A | 9/1988 | Keller et al. | |
| 4,784,609 | A | 11/1988 | Lau | 439/56 |
| 4,797,114 | A | 1/1989 | Lau | 439/79 |
| 4,807,280 | A | 2/1989 | Posner et al. | |
| 4,811,169 | A | 3/1989 | De Luca et al. | |
| 4,815,104 | A | 3/1989 | Williams et al. | 375/36 |
| 4,820,200 | A | 4/1989 | Lau | 439/607 |
| 4,840,568 | A | 6/1989 | Burroughs et al. | 439/49 |
| 4,861,281 | A | 8/1989 | Warner | |
| 4,874,317 | A | 10/1989 | Lau | 439/54 |
| 4,975,072 | A | 12/1990 | Afshar | |
| 4,975,087 | A | 12/1990 | Williams et al. | |
| 5,078,624 | A | 1/1992 | Burroughs et al. | 439/668 |
| 5,127,851 | A | 7/1992 | Hilbert et al. | 439/532 |
| 5,160,273 | A | 11/1992 | Carney | 439/108 |
| 5,178,558 | A | 1/1993 | Knox et al. | |
| 5,199,878 | A | 4/1993 | Dewey et al. | 439/49 |
| 5,205,762 | A | 4/1993 | Carney | 439/607 |
| 5,214,673 | A | 5/1993 | Morgenstern et al. | 375/36 |
| 5,220,600 | A | 6/1993 | Chouanard et al. | |
| 5,233,501 | A | 8/1993 | Allen et al. | 361/733 |
| 5,265,156 | A | 11/1993 | Eason et al. | |
| 5,281,163 | A | 1/1994 | Knox et al. | |
| 5,290,180 | A | 3/1994 | Herrmann | 439/716 |
| 5,343,194 | A | 8/1994 | Bowdon | |
| 5,371,786 | A | 12/1994 | Paul | |
| 5,393,249 | A | 2/1995 | Morgenstern et al. | 439/668 |
| 5,430,615 | A | 7/1995 | Keeth et al. | 361/788 |
| 5,432,847 | A | 7/1995 | Hill et al. | 439/328 |
| 5,439,395 | A | 8/1995 | Laukzemis | 439/668 |
| 5,454,725 | A | 10/1995 | Speiser et al. | 439/61 |
| 5,456,608 | A | 10/1995 | Rogers et al. | |
| 5,467,062 | A | 11/1995 | Burroughs | 333/124 |
| 5,482,469 | A | 1/1996 | Seiceanu et al. | |
| 5,530,954 | A | 6/1996 | Larson et al. | |
| 5,546,282 | A | 8/1996 | Hill et al. | 361/796 |
| 5,552,962 | A | 9/1996 | Feustel et al. | |
| 5,582,525 | A | 12/1996 | Louwagie et al. | 439/668 |
| 5,631,902 | A | 5/1997 | Yoshifuji et al. | |
| 5,634,822 | A | 6/1997 | Gunell | 439/668 |
| 5,639,261 | A | 6/1997 | Rutkowski et al. | |
| 5,685,741 | A | 11/1997 | Dewey et al. | 439/668 |
| 5,879,197 | A | 3/1999 | Dewey | 439/668 |
| 5,897,383 | A | 4/1999 | Johnston | |
| 5,903,829 | A | 5/1999 | Anderson et al. | |
| 5,909,155 | A | 6/1999 | Anderson et al. | |
| 5,913,701 | A | 6/1999 | Olson et al. | 439/668 |
| 5,938,478 | A | 8/1999 | Werner | 439/668 |
| 5,980,321 | A | 11/1999 | Cohen et al. | 439/608 |
| 5,983,294 | A | 11/1999 | Kim et al. | |
| 5,993,259 | A | 11/1999 | Stokoe et al. | 439/608 |
| 5,997,311 | A | 12/1999 | Crouse et al. | |
| 6,077,113 | A | 6/2000 | Lecomte | |
| 6,116,961 | A | 9/2000 | Henneberger et al. | 439/668 |
| 6,146,167 | A | 11/2000 | Kutsch | 439/188 |
| 6,198,720 | B1 | 3/2001 | Deschaine et al. | |
| 6,241,562 | B1 | 6/2001 | Benda et al. | 439/731 |
| 6,269,162 | B1 | 7/2001 | McMillan | |
| RE37,368 | E | 9/2001 | Huppenthal et al. | 174/74 R |
| 6,299,483 | B1 | 10/2001 | Cohen et al. | 439/608 |
| 6,328,608 | B1 | 12/2001 | Olson et al. | 439/668 |
| 6,345,986 | B1 | 2/2002 | Follingstad et al. | 439/64 |
| 6,352,451 | B1 | 3/2002 | Henneberger et al. | 439/668 |
| 6,422,902 | B1 | 7/2002 | Ogren et al. | 439/668 |
| 6,453,014 | B1 | 9/2002 | Jacobson et al. | 379/26.01 |
| 6,493,319 | B1 | 12/2002 | Kramarczyk et al. | 370/241 |
| 6,503,105 | B1 | 1/2003 | Johnsen | 439/668 |
| 6,572,413 | B2 | 6/2003 | Olson et al. | |
| 6,575,792 | B2 | 6/2003 | Henneberger et al. | |
| 6,587,354 | B1 | 7/2003 | Kutsch et al. | |
| 2002/0182938 | A1 | 12/2002 | Fuller | |
| 2002/0182939 | A1 | 12/2002 | Jayne et al. | 439/668 |
| 2002/0190700 | A1 | 12/2002 | Tzotzkov | 323/266 |
| 2003/0013346 | A1 | 1/2003 | Perrone et al. | 439/668 |
| 2003/0022543 | A1 | 1/2003 | Ogren et al. | 439/188 |
| 2003/0022559 | A1 | 1/2003 | Musolf et al. | 439/668- |

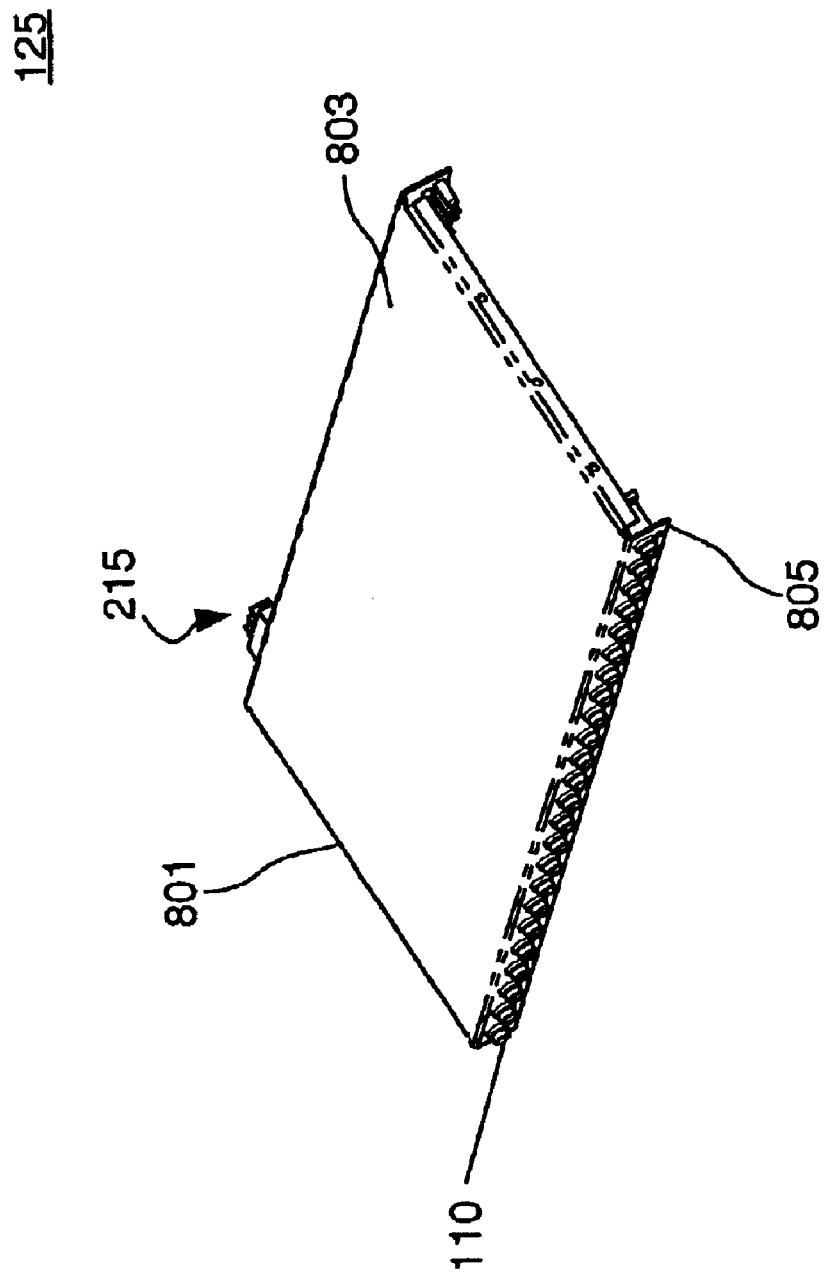

MODULAR CROSS-CONNECT WITH REMOVABLE SWITCH ASSEMBLY

BACKGROUND OF THE INVENTION

1. Field of the Invention

The present invention relates to a modular cross-connect used for routing, monitoring and testing of signals in, for example, the telecommunications industry.

2. Related Art

Digital signal cross-connect (DSX) equipment plays an important part in the installation, monitoring, testing, restoring, and repairing of digital communications networks. Digital signal cross-connect modules are often used to provide cross-connections of digital signal lines at locations that are suited for testing and repairing the digital lines. For instance, many telephone service providers' central offices have digital signal cross-connect modules. A single DSX module generally interconnects two telecommunications apparatuses of a telecommunications network. The module is typically mounted in a rack or bank with similar modules. The bank forms a digital signal cross-connect unit (DSX unit). The DSX modules provide a point of access to the digital signals being transmitted over the digital lines of the telecommunications network, yet appear as almost invisible to the rest of the network. By utilizing the DSX modules, an operator can monitor, test and repair the digital equipment that is used by the telecommunications network without significantly interfering with the transmission of signals.

A need exists in the industry for low cost DSX chassis that have high density of modules.

BRIEF SUMMARY OF THE INVENTION

Accordingly, the present invention is directed to a modular cross connect with a removable switch assembly that substantially obviates one or more of the problems and disadvantages of the related art.

There is provided a modular cross-connect including a chassis configured to receive a plurality of cross-connect modules therein and having a front face and a rear cover. A plurality of fixed portions of cross-connect modules are mounted in the chassis such that rear facing connectors of each of the fixed portions extend outward from the rear cover of the chassis. Each fixed portion has a front-facing connector configured to mate with a rear-facing connector of a corresponding removable portion of a cross-connect module.

A plurality of slots are formed in the chassis. Each slot is configured to receive a removable portion of a cross-connect module and to align a rear-facing connector of a removable portion of a cross-connect module for connection with a front-facing connector of a fixed portion of a cross-connect module. A plurality of doors are at the front face of the chassis, each door corresponding to one of the plurality of slots and being pivotally mounted for rotation about an axis parallel to a width of the chassis. Insertion of a removable portion of a cross-connect module into one of the plurality of slots causes a corresponding one of the plurality of doors to pivot about the axis to permit entry of the removable portion of the cross-connect module into the chassis.

In a further aspect of the invention the doors each include a rail for guiding the module during insertion, doors are mounted on a horizontally mounted rod extending in a direction perpendicular to direction of insertion.

In a further aspect of the invention each module includes a release lever and a locking tab for coupling to a corresponding door.

In a further aspect of the invention a rail plate with grooves is added for guiding the modules during insertion.

In a further aspect of the invention a plurality of printed circuit boards are coupled to the connectors on the rear cover and aligned parallel to a direction of insertion of the modules.

In a further aspect of the invention each module includes two release levers and two locking tabs for coupling to a corresponding door and to a rail plate mounted over the bottom plate.

In a further aspect of the invention the modules may be inserted in two different orientations.

In a further aspect of the invention there is included a connector on the printed circuit board for engaging the module when the module is inserted, the connector having a chamfered edge. The connector may be a multi-pin make-before-break connector.

In a further aspect of the invention the top housing assembly of the chassis includes a Printed Circuit Board assembly with a plurality of switches, each of the switches having an LED integrally mounted within it. In a further aspect of the invention each module includes a micro-strip line PCB. The Printed Circuit Board assembly includes a micro-strip line PCB.

In a further aspect of the invention each switch includes a removable lense over the LED.

In a further aspect of the invention the module includes a plurality of jacks on its front side, each jack including a strain relief.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 8 illustrates a top housing assembly of the chassis of one embodiment of the present invention.

DETAILED DESCRIPTION OF THE INVENTION

Reference will now be made in detail to the preferred embodiments of the present invention, examples of which are illustrated in the accompanying drawings.

One embodiment of a cross-connect of the present invention is described with reference to FIGS. 1–14.

Figure 1:
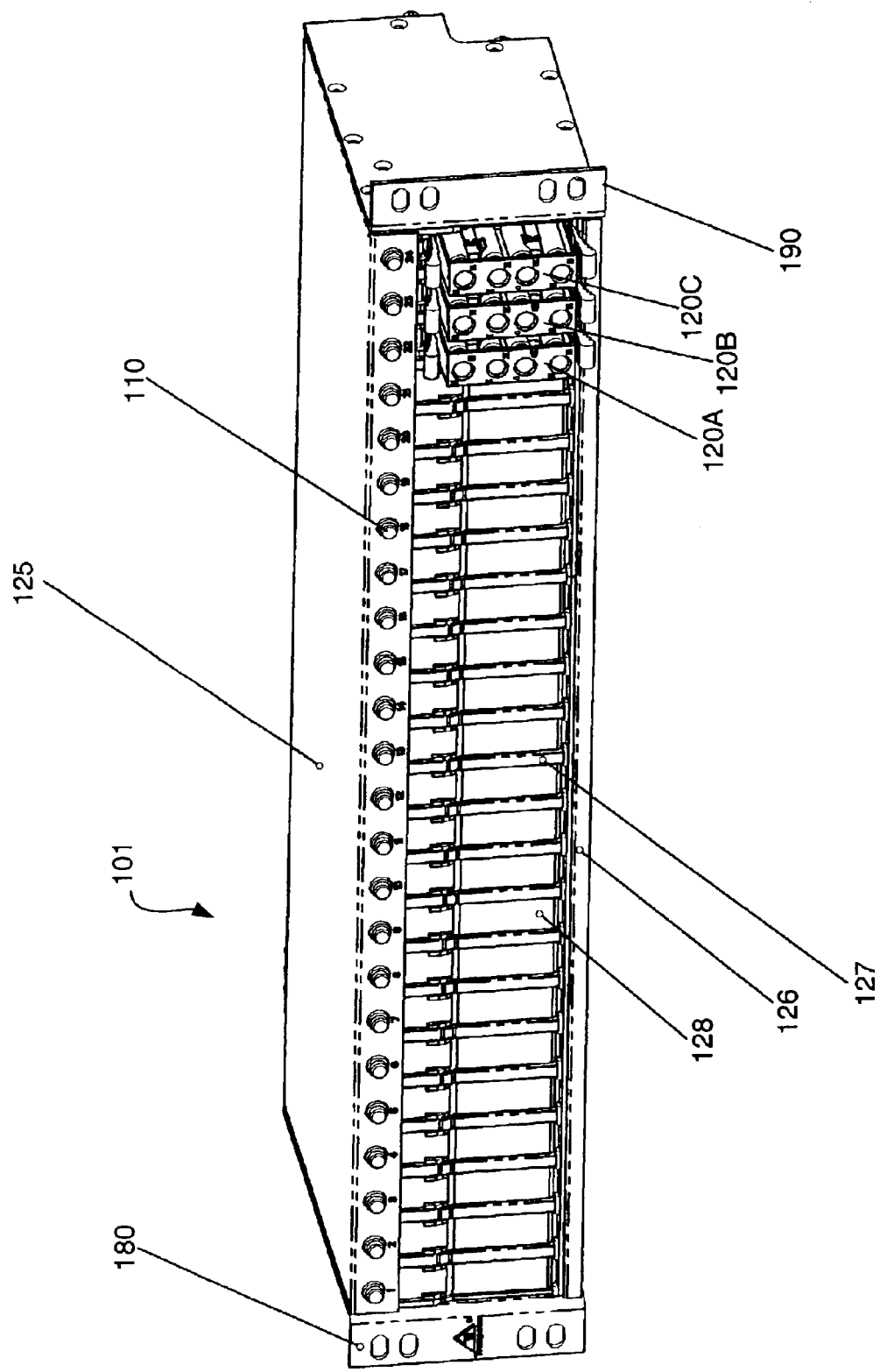
FIG. 1 is a front isometric view of one embodiment of a cross-connect chassis of the present invention.

FIG. 1 is a front isometric view of a chassis 101 that receives a plurality of modules 120. Three cross-connect modules 120A–120C are depicted for purposes of illustration. Each module 120 is inserted into an interior space of chassis 101. Sides of chassis 101 include a left side panel 180 and a right side panel 190. Chassis 101 also includes a top housing assembly 125, left and right side panels 180, 190, a bottom plate 126, a plurality of spacers 127, and a plurality of doors 128, which are shown in a closed position in FIG. 1. Doors 128 are closed when modules 120 are removed to minimize the amount of dust and other debris that may enter the interior of chassis 101. FIG. 1 also shows push buttons 110, with internal LEDs.

Figure 2:
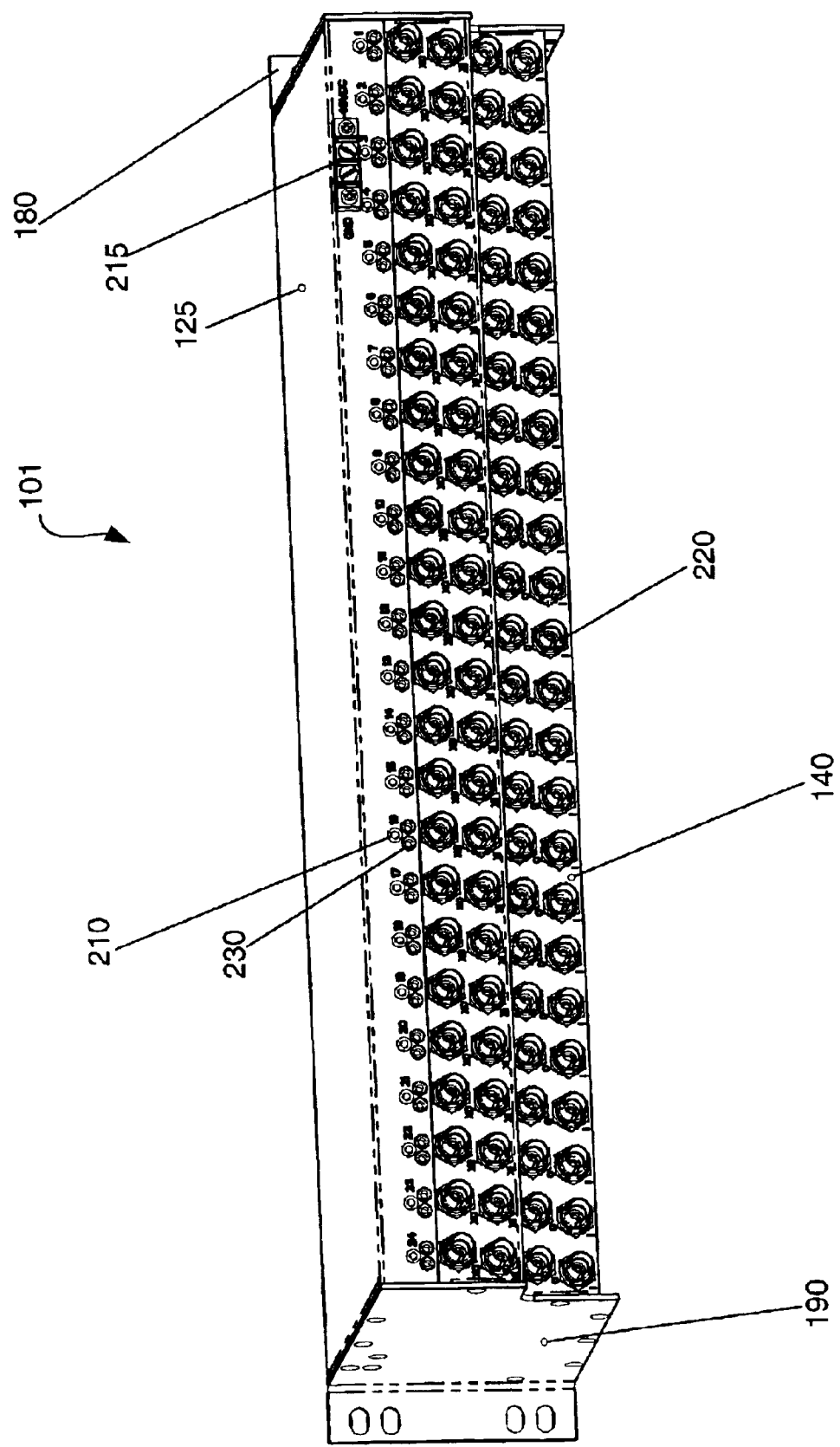
FIG. 2 is a rear isometric view of one embodiment of the chassis of the present invention.

FIG. 2 is a rear isometric view of chassis 101. A back wall (rear cover) 140 of chassis 101 has a plurality of circular openings. When module 120 is positioned in chassis 101, BNC jacks 220 extending from a rear portion of module 120 extend outward from corresponding openings in back wall 140. Each BNC jack 220 is preferably secured in position in an opening of back wall 140 by a nut 490 (not shown in FIG. 2, see FIG. 4) that mates with a threaded portion on the body of jack BNC 220. This also secures the rear portion (discussed below) of module 120 in chassis 101.

As further shown in FIG. 2, chassis 110 includes left side panel 180 and right side panel 190. Top housing assembly 125 includes a terminal block 215, LEDs 210, and tracer ports 230.

Chassis 101, as shown in FIGS. 1 and 2, includes top housing assembly 125, side panels 180, 190, bottom plate 126, and rear cover 140. Rear cover 140 is also used as a dust cover and a platform to securely mount the rear portion of modules 120. Top housing assembly 125 is used for mounting switches 110, tracer lights 230, and power wiring. Bottom plate 126 is used as a platform to mount and support rail plate 101 (see FIG. 11).

Figure 4:
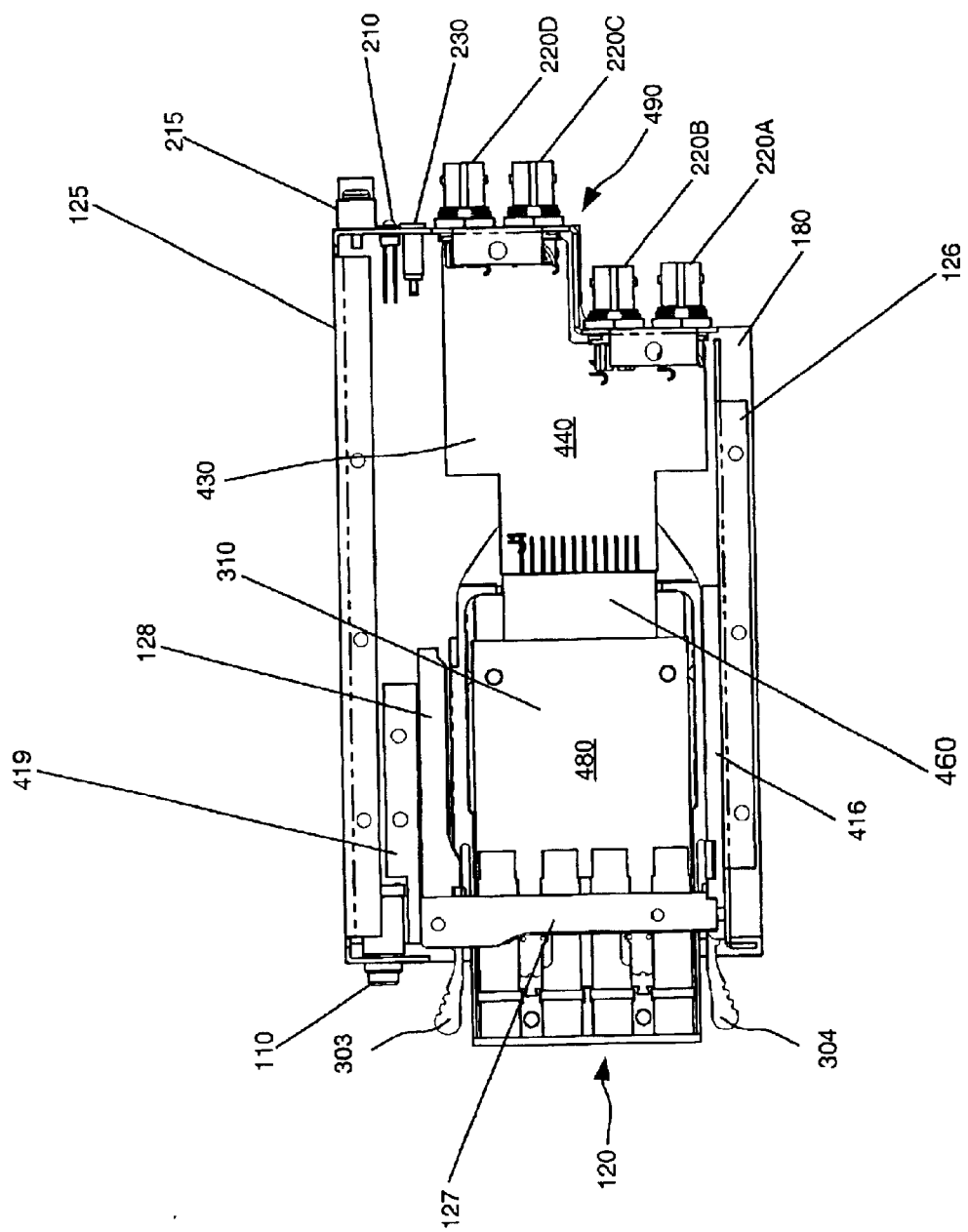
FIG. 4 is a partial cross-sectional view of a chassis and one inserted cross-connect module of one embodiment of the present invention.

FIG. 4 is a side or end cross-sectional view of chassis 101 illustrating positioning of module 120 within chassis 101. This view illustrates that module 120 includes a fixed (or rear) portion 440 (rear PCB assembly 440) and a removable (or front) portion 480 (also called a switch PCB assembly).

Removable portion 480 is electrically connected to fixed portion 440 by an edge connector 460 (a multi-pin connector). Edge connector 460 of fixed portion 440 mates with an edge of a printed circuit board (PCB) 310 of removable portion 480. Edge connector 460 preferably has chamfer edges and nickel/gold plating to improve reliability by reducing wear during insertion to and withdrawal from rear PCB assembly 440.

Printed circuit board 310 of removable portion 480 mates with rear PCB assembly 440. Side panel 180 is shown at the bottom of the assembly in FIG. 4. An upper support bar 419 is shown at the top of the assembly. A rail 416 of rail plate 1101 at bottom is used to guide insertion of module 120. FIG. 4 also shows a cross-section of top housing assembly 125, terminal block 215, and a cross-section of bottom support plate 126. As illustrated, top housing assembly 125 includes push button switch 110 tracer port 230, and rear LED 210.

Figure 15:
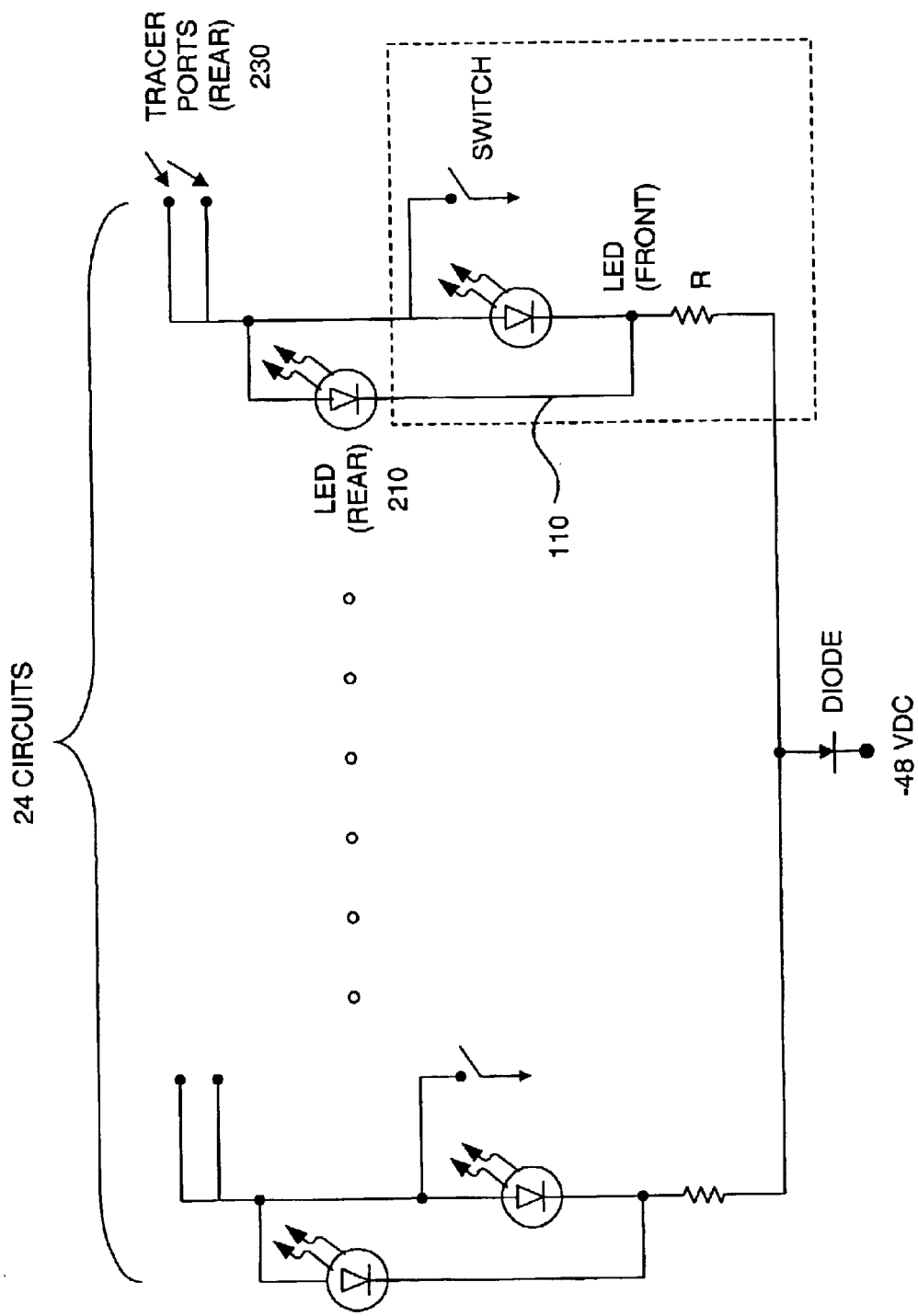
FIG. 15 shows an electrical schematic of tracer circuitry of the chassis.
Figure 16:
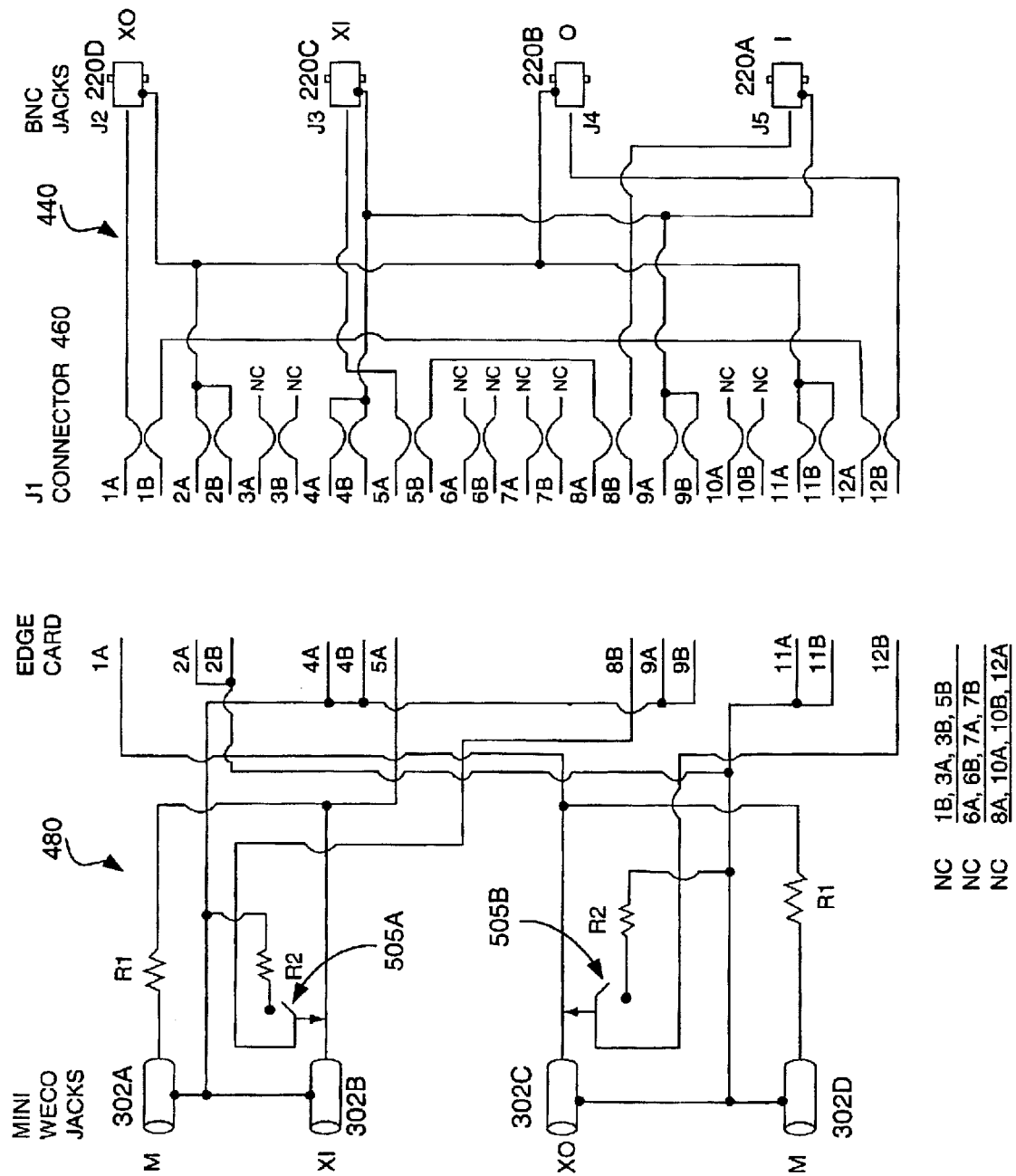
FIGS. 16–17 illustrate electrical schematics of connections between the cross-connect modules and chassis in two different insertion orientations.
Figure 17:
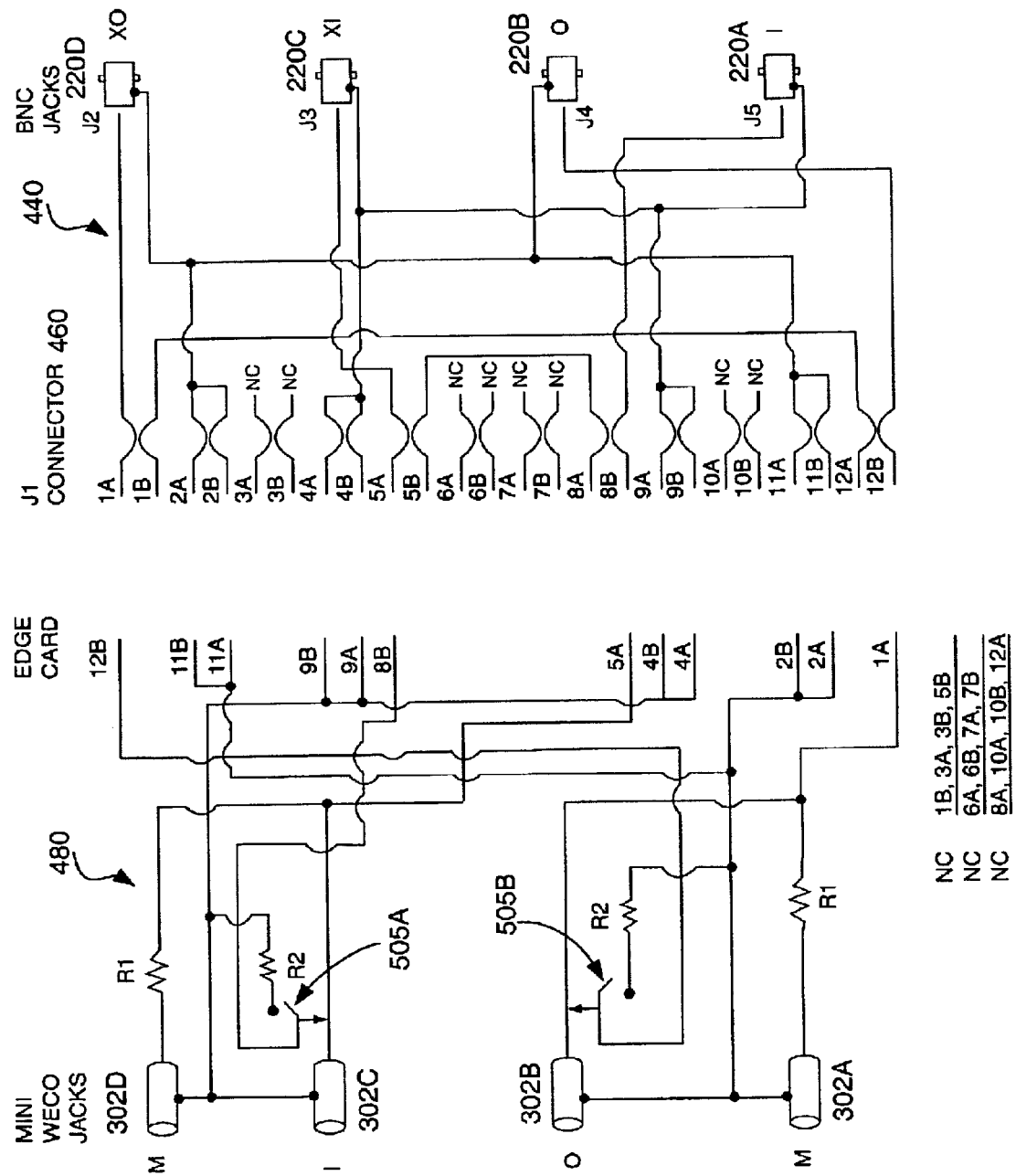

Rear PCB assembly 440 includes 4 edge-mount BNC jacks 220, a PCB board 430, and a make-before-break edge connector 460. Microstrip line techniques are used on the board design to control the impedance of the conductors to achieve optimum RF parameters. An input signal normally enters at BNC "IN" jack 220A, moves through a micro-strip line on one side of board 430, loops through multi-pin connector 460, moves through a micro-strip line on the other side of PCB 430, and exits at BNC "XIN" jack 220C. The signal paths are similar for "OUT" and "XOUT." Specifically, an output signal normally enters through BNC "XOUT" jack 220D, moves through a micro-strip line on one side of board 430, loops through multi-pin connector 460, moves through a micro strip line on the other side of board 430, and exits at BNC "OUT" jack 220B. (See also circuit diagram of FIG. 15, which shows an electrical schematic of tracer circuitry of chassis 101, and FIGS. 16–17, which show electrical schematics of module 120 and chassis 101 in two different insertion orientations.)

When module 120 is inserted and mates with rear PCB assembly 440, contacts of multi-pin edge connector 460 are forced open and the signal moves to PCB 310 then back to the rear PCB 430 before leaving chassis 101. Thus, module 120 allows the user to monitor the signals and re-route them if necessary.

Figure 3:
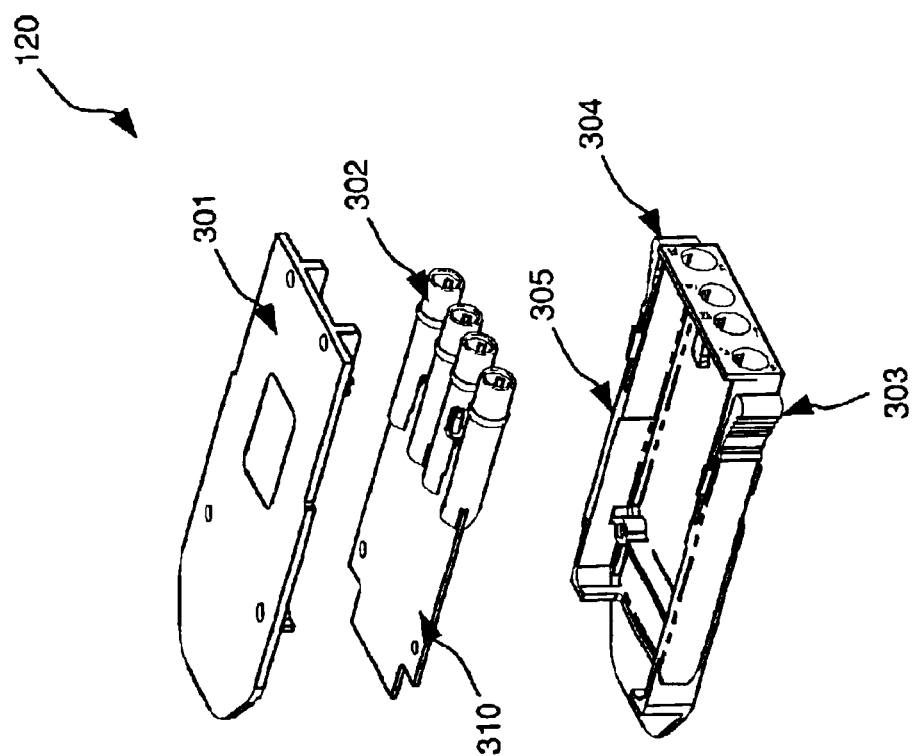
FIG. 3 is an isometric assembly view of an cross-connect module of one embodiment of the present invention.

FIG. 3 shows an exploded, isometric view of removable portion 480 of module 120. As shown in FIG. 3, module 120 includes a thermoplastic housing (frame) 305, a thermoplastic lid 301, and a printed circuit board (PCB) 310 that includes four mini-WECo jacks 302. PCB 310 is enclosed within thermoplastic housing 305 and thermoplastic lid 301. FIG. 3 also shows two locking release levers 303, 304, which are used to disengage module 120 from chassis 101 upon withdrawal.

Figure 5A:
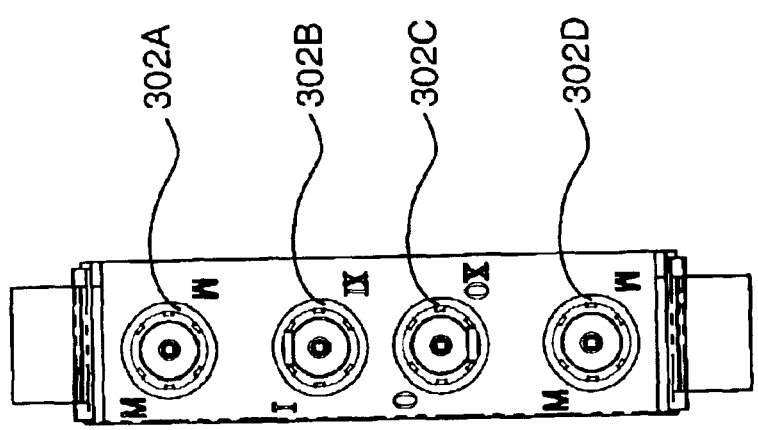
FIGS. 5A–5E show different views of a cross-connect module of one embodiment of the present invention.
Figure 5B:
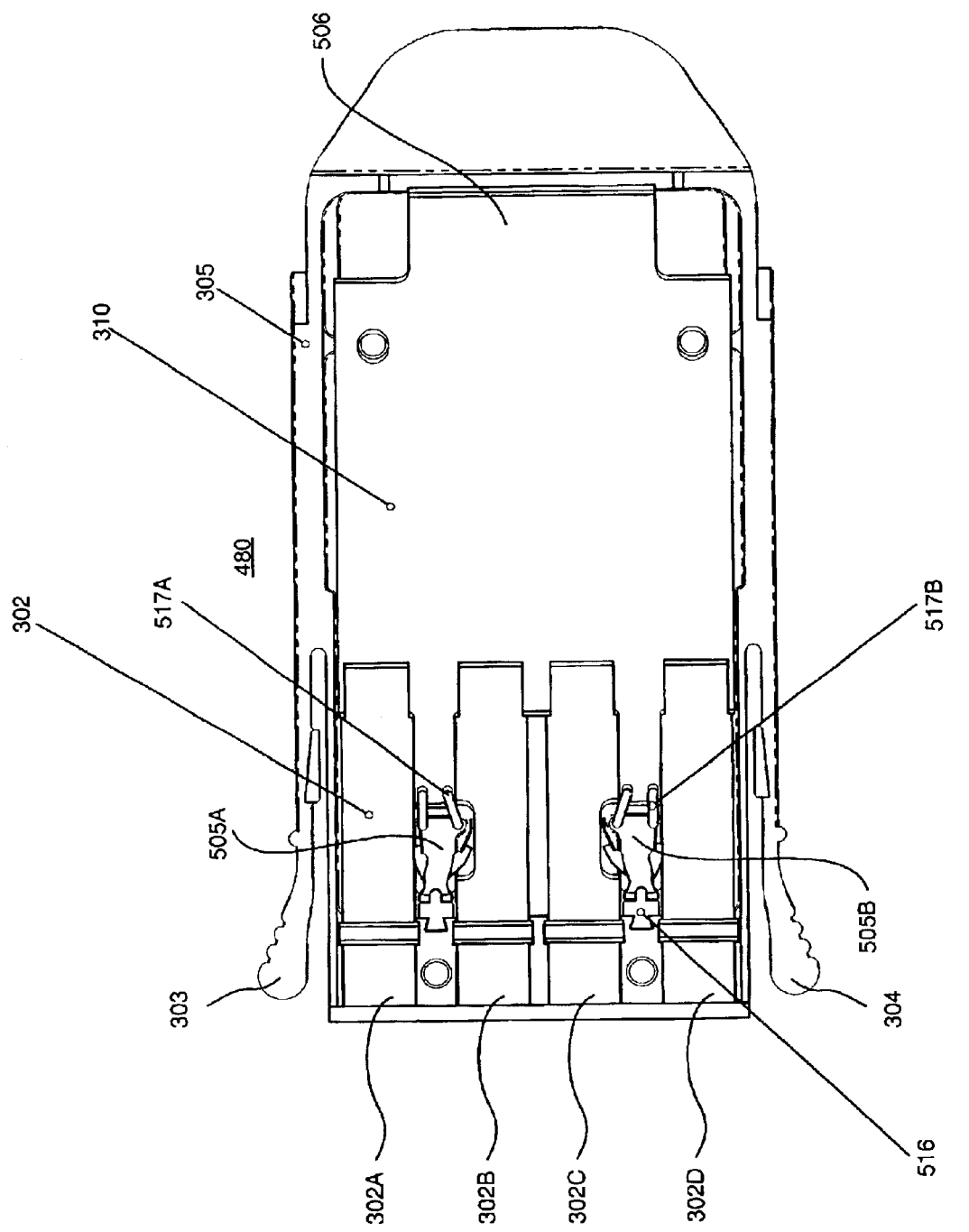
Figure 7A:
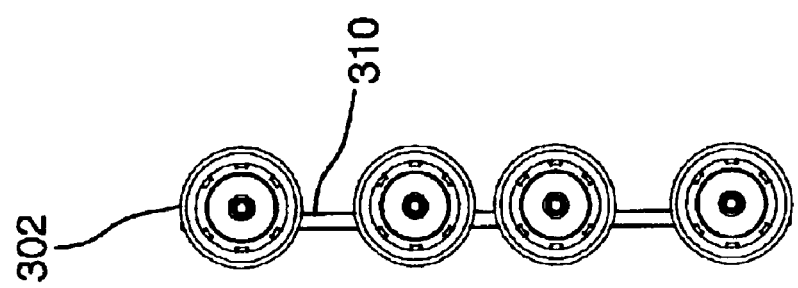
FIGS. 7A–7C illustrate the printed circuit board of an insertion module of one embodiment of the present invention.
Figure 7B:
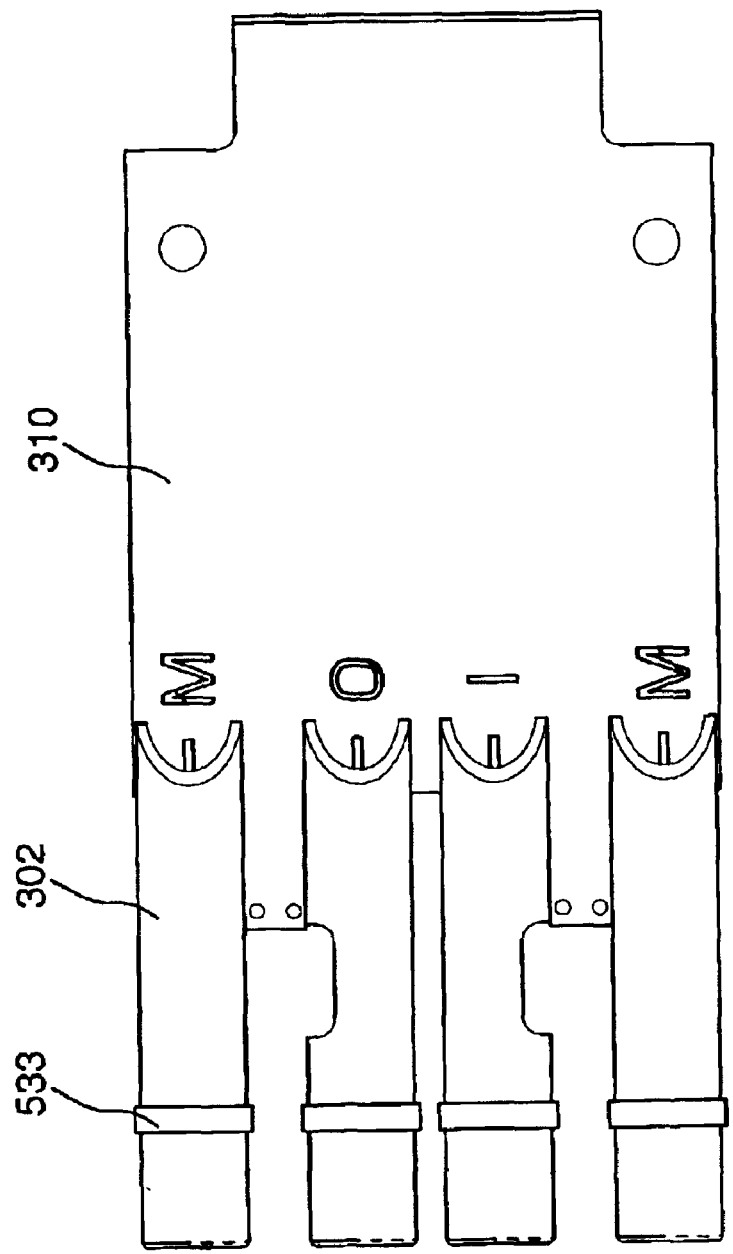
Figure 7C:
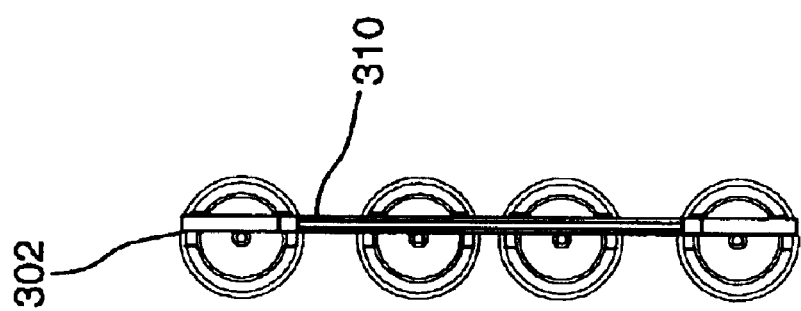

FIGS. 5A–5B show two views of removable module 120. Module 120 includes housing (frame) 305 having PCB 310 mounted therein. (Several views of PCB 310 are also shown in FIGS. 7A–7C.) PCB 310 includes a portion 506 configured for mating with edge connector 460 of fixed portion 440. Four MiniWECo jacks 302 are mounted on a front edge of PCB 310. Micro-strip conductors on PCB 310 carry electrical signals from portion 506 to jacks 302. A first switch assembly 505A normally connects the conductors of jacks 302B and contact post 517A. A second switch assembly 505B normally connects the conductors of jacks 302C and contact post 571B. Switch 505A is connected to contact post 517B (breaking the normal connection) upon insertion of a MiniWECo plug into jack 302B. Similarly, switch 505B is connected to 571A (breaking the normal connection) upon insertion of a MiniWECo plug into jack 302C. 302A and 302D are for monitoring purposes. FIG. 5B also shows a view of actuator 516 and contact post 517, which are positioned towards the front of module 120.

Figure 5C:
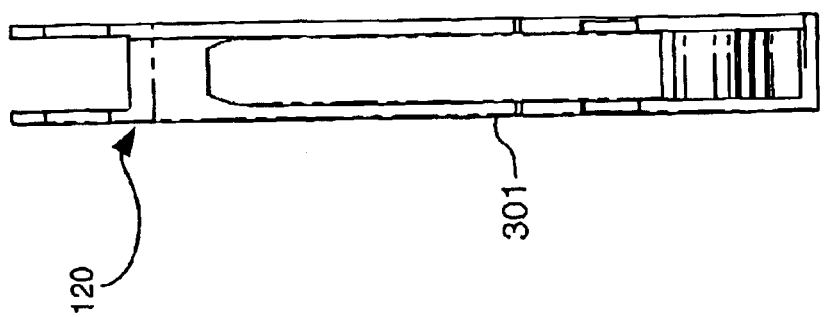
Figure 5D:
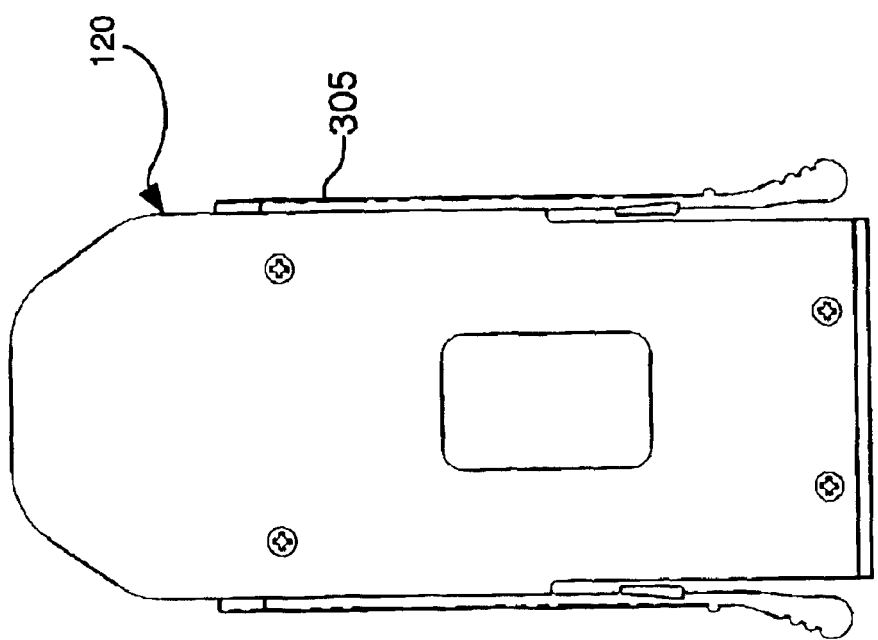
Figure 5E:
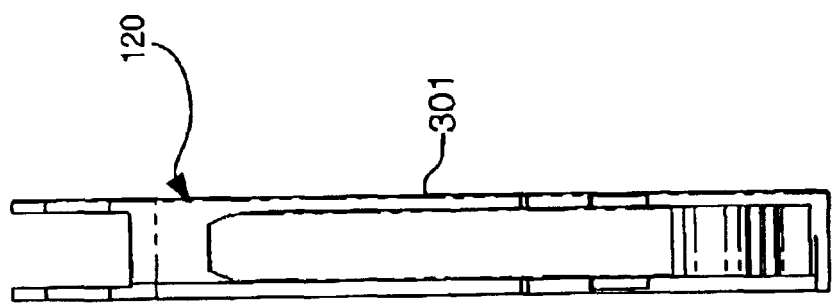

FIGS. 5C–5E show additional views of module 120. Specifically, FIGS. 5C and 5E shows two side views of module 120, and FIG. 5D shows module 120 with thermoplastic lid 301 mounted and closed.

Figure 5F:
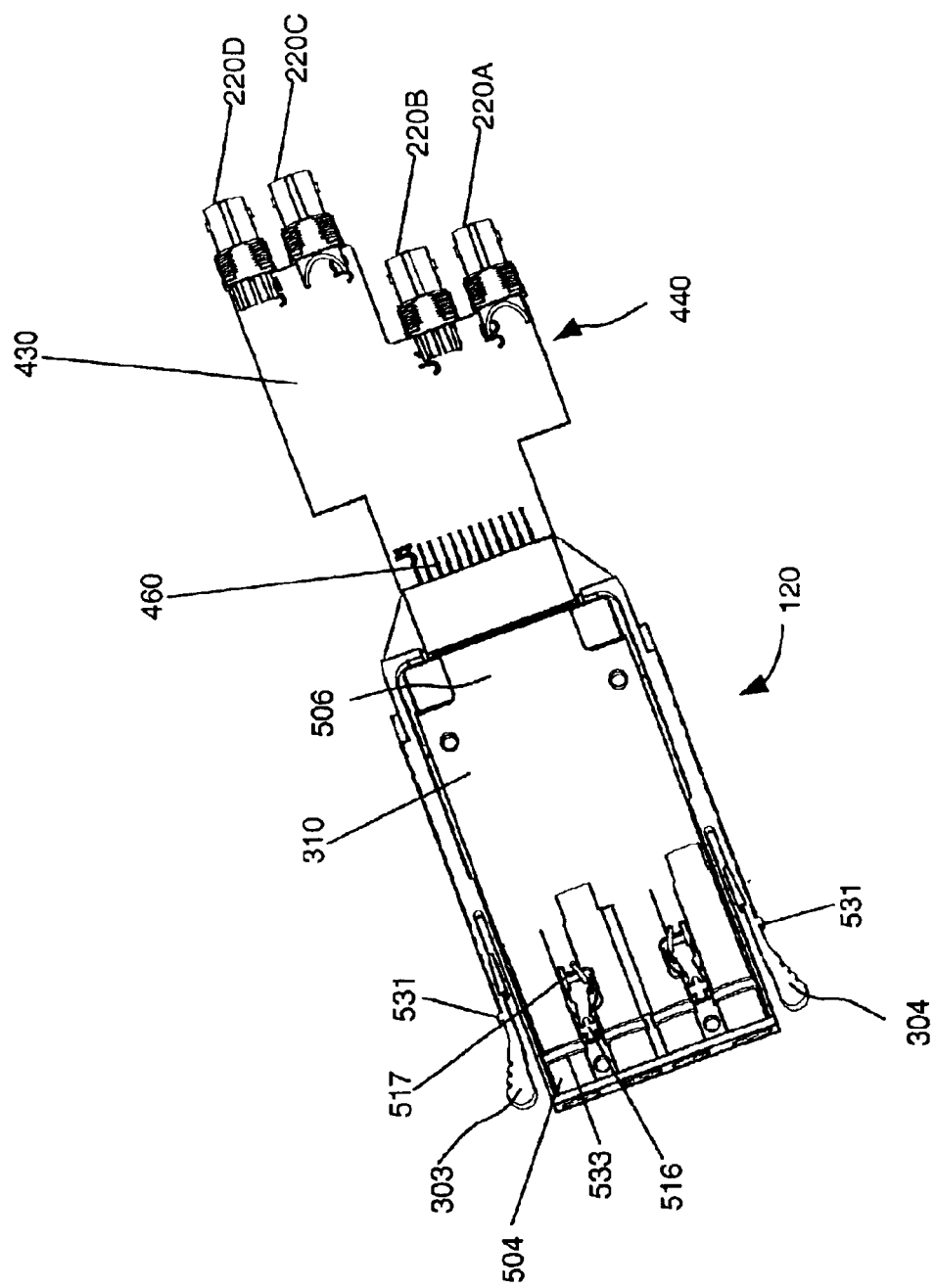
FIG. 5F shows a partial plan view of a printed circuit board (PCB) of a fixed portion mated to a printed circuit board of a removable portion of the cross-connect module.

FIG. 5F shows another partial view of module 120 that is mated with rear PCB assembly 440. Rear PCB assembly 440 includes micro-strip line PCB 430, BNC jacks 220 coupled to PCB 430, and edge connector 460. Removable portion 480, which is mated with rear PCB assembly 440, includes, as also shown in previous figures, PCB 310, mini-WECo jacks 302, and actuator 516. Module 120 also includes a rail ridge (see also FIG. 12, element 1201) at the top, locking release levers 303, 304 and locking tabs 531. Each mini-WECo jack 302 also has a strain relief ridge 533, for improved product reliability. Strain relief ridge 533 is designed to minimize the insertion forces imposed on solder joint between the mini-WECo jack 302 and PCB assembly 440. When a plug is inserted into the mini-WECo jack 302, the strain relief ridge 533 will absorb and distribute the forces from the insertion onto the thermoplastic housing 305 and the thermoplastic lid 301, with which it is in direct contact, and then transfer the insertion forces onto the chassis 101 (rather than onto the PCB 310). This can prevent solder joint fracture that will eventually degrade performance of chassis 101.

Referring to FIGS. 4, 5A and 5C, fixed portion 440 is described in further detail. Fixed portion 440 includes PCB 430 upon which BNC jacks 220 are mounted at one edge. Edge connector 460 is mounted on an opposite edge of PCB 430. Microstrip conductors on PCB 430 electrically connect BNC jacks 220 to edge connector 460. Edge connector 460 makes connections between the conductors so that jack 220A is normally connected to jack 220C, and jack 220B is normally connected to jack 220D, to provide cross-connect functionality. However, when removable portion 480 is mated with edge connector 460, the normal connections made by edge connector 460 are broken and the conductors are instead electrically connected to conductors within removable portion 480.

Figure 6A:
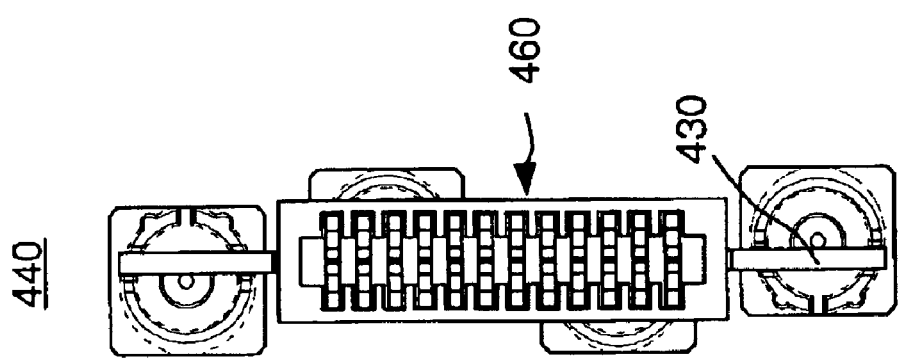
FIGS. 6A–6C illustrate three different views of a fixed PCB assembly portion of one embodiment of the present invention.
Figure 6B:
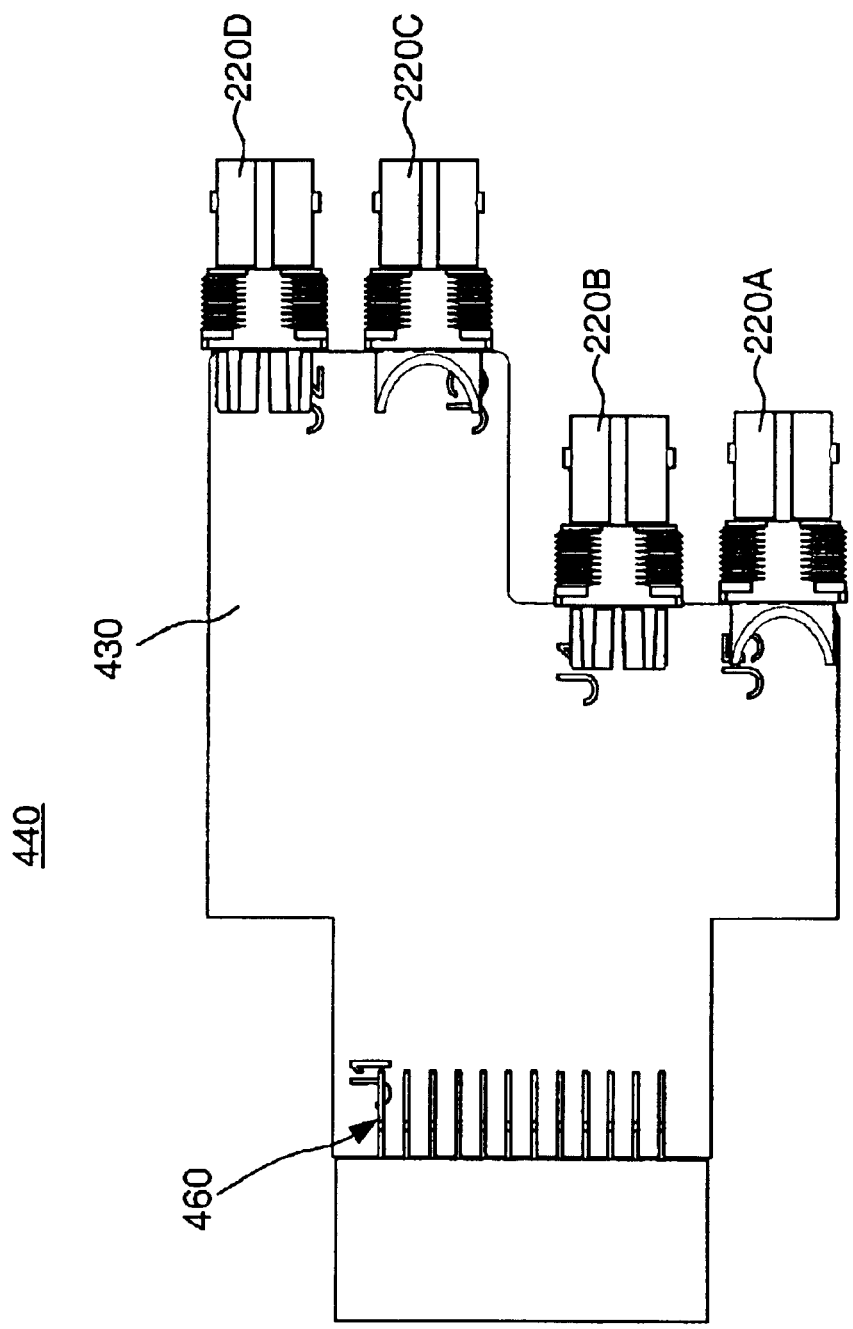
Figure 6C:
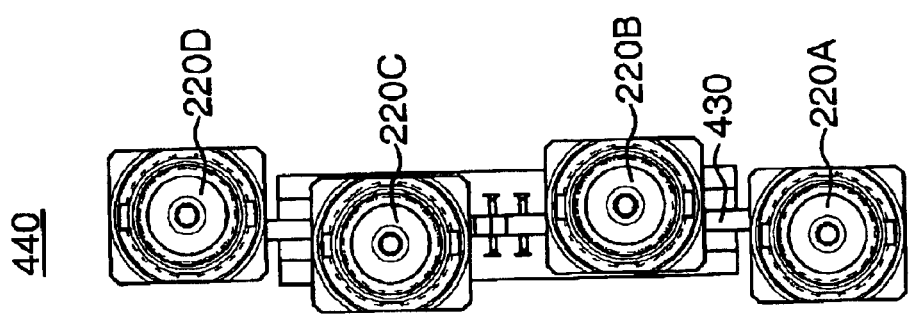

FIGS. 6A–6C illustrate additional views of fixed portion 440 of module 120. Specifically, FIG. 6A illustrates a front view of fixed portion 440 (i.e., looking into chassis 101 through open door 128), FIG. 6B illustrates a side view of fixed portion 440, and FIG. 6C illustrates a back view of fixed portion 440, looking from the rear of chassis 101 towards BNC jacks 220.

FIGS. 7A–7C illustrate three additional views of printed circuit board 310 of removable portion 480. Specifically, FIG. 7A shows a view looking into chassis 101 from the front, illustrating mini-WECo jacks 302 and a cross-section of PCB 310. FIG. 7B illustrates a side view (i.e., looking at PCB 310 from a direction of right side panel 190), and FIG. 7C shows a rear view of PCB 310. Note in particular mini-WECo jacks 302 and their stress relief ridges 533 in FIG. 7B.

Figure 9:
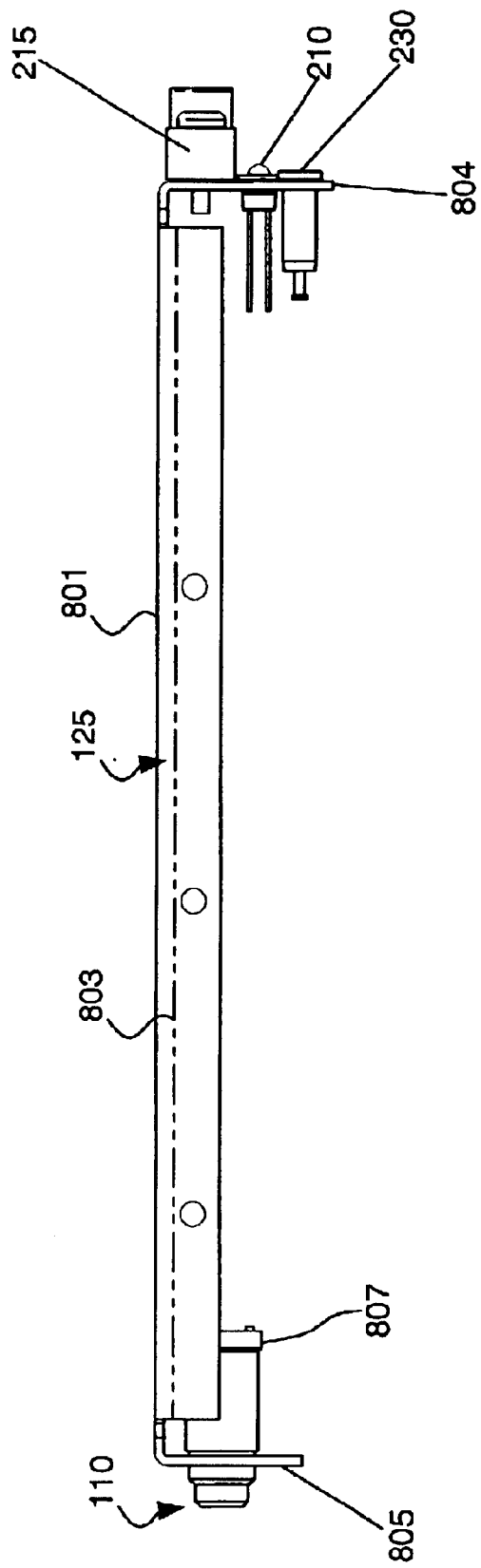
FIG. 9 illustrates a cross-sectional view of the top housing assembly.

FIGS. 8 and 9 illustrate top housing assembly 125 that forms the top portion of chassis 101. Top housing assembly 125 includes a chassis member 801 having a portion 803 that forms a top face of chassis 101, a portion 805 that forms part of the front face of chassis 101 and a portion 804 that forms part of the rear face of chassis 101. Switches 110 are structurally mounted on a PCB assembly portion 805. LEDs 210 and tracer ports 230 are mounted on portion 804. Switches 110 are electrically connected to a PCB 807. LEDs 210 and tracer ports 230 are electrically connected to PCB assembly 807 via wires (not shown). PCB assembly 807, terminal block 215, LEDs 210, tracer ports 230 and switches 110 constitute tracing circuitry that has no electrical interconnection to modules 120. Configuration and operation of tracer circuitry would be apparent to a person skilled in the relevant art, and is illustrated in schematic form in FIG. 15, and FIGS. 16–17, which show electrical schematics of module 120 and chassis 101 in two different insertion orientations.

The PCB assembly 807 includes a PCB with pre-installed surface mount resistors and diodes (not shown in the figures), and push-button switch assemblies that include switch bodies 110, removable/replaceable color lenses, and LEDs (not shown, housed inside switch 110).

Figure 10:
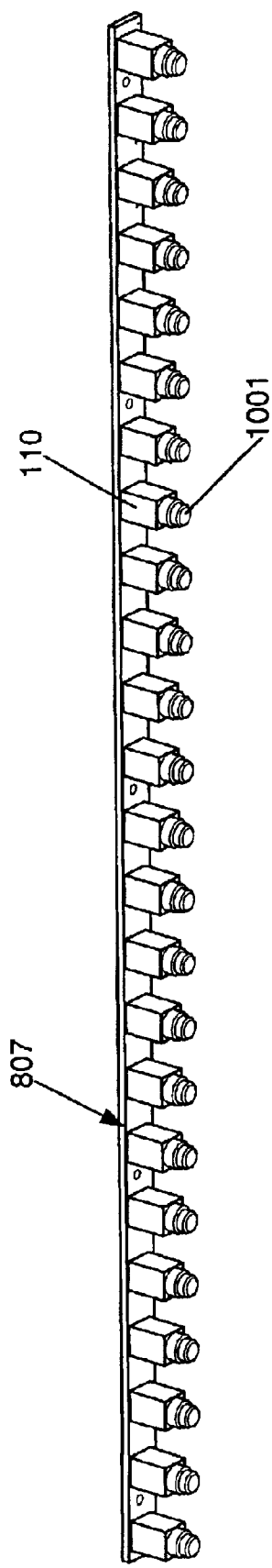
FIG. 10 illustrates an isometric view of a PCB assembly portion of the top housing assembly.

FIG. 10 illustrates an additional view of PCB assembly 807. As shown in FIG. 10, PCB assembly 807 includes a plurality of switches 110, each of which includes an LED mounted integrally within it. Each switch 110 also includes a color-coded lens 1001, which may be easily replaced in the field.

Figure 11:
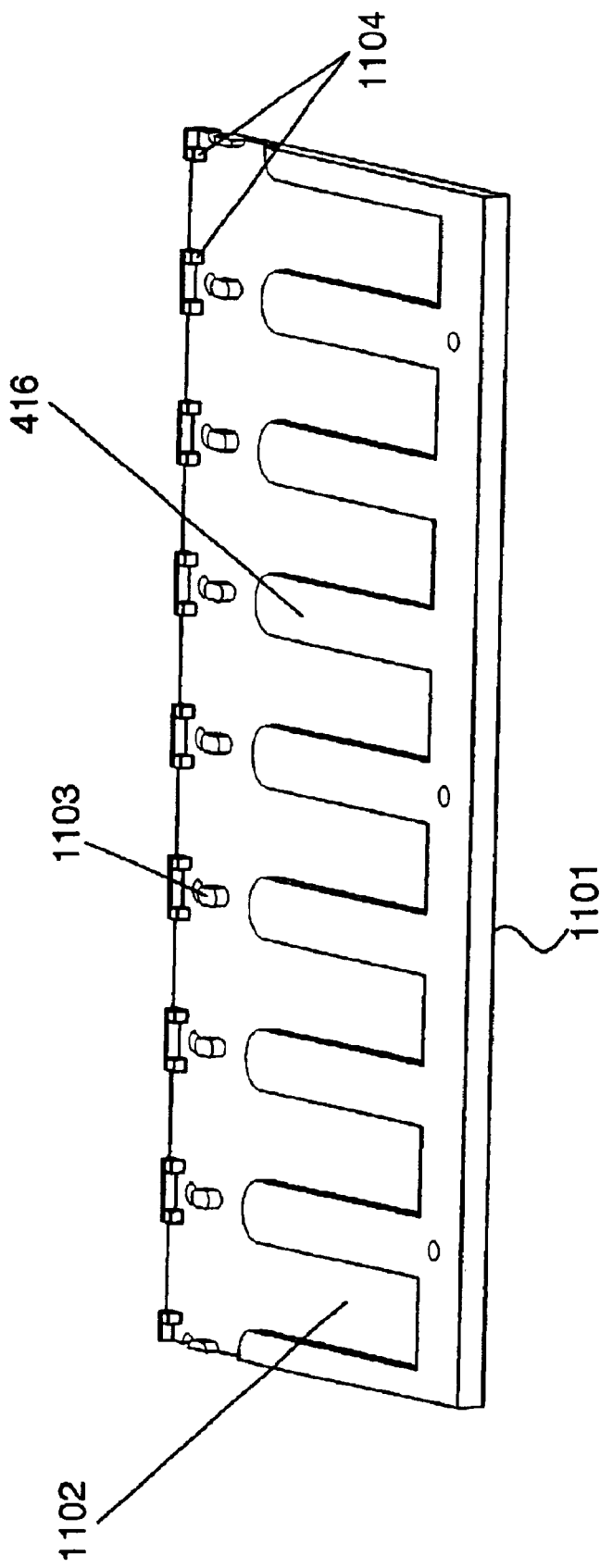
FIG. 11 shows an isometric view of a rail plate of one embodiment of the present invention.

FIG. 11 is an illustration of a thermoplastic rail plate 1101, which is mounted above bottom plate 126 in chassis 101, and is used to guide modules 120 being inserted into chassis 101. As shown in FIG. 11, rail plate 1101 includes rail grooves 1102, rails 416, spacer stabilizers 1103 to keep spacers 127 from moving after installation, and locking stoppers 1104 that mate with tabs 531 for guiding and fixing in place modules 120.

Figure 12:
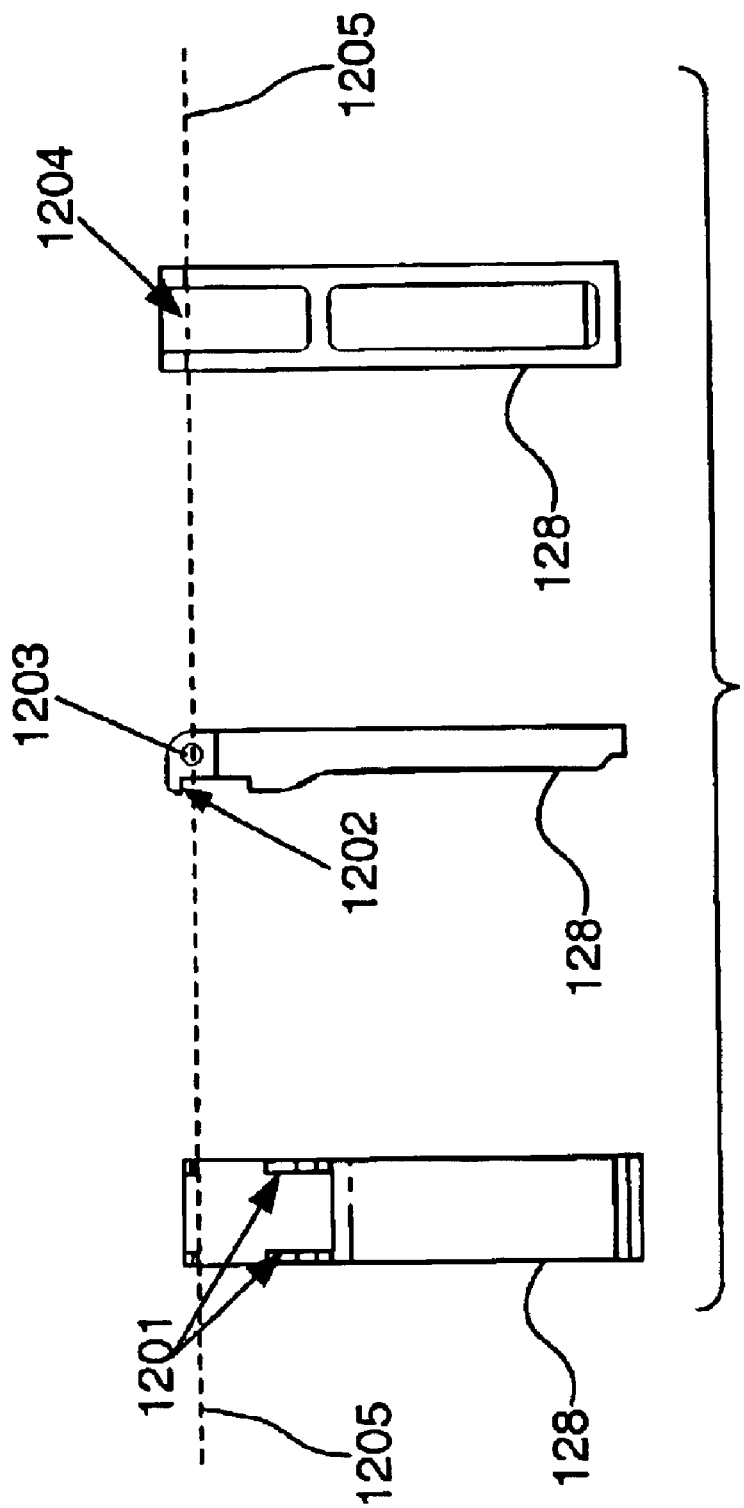
FIG. 12 illustrates additional detail of a door of one embodiment of the present invention.

FIG. 12 illustrates three views of door 128, which upon insertion of module 120, also functions as a rail guide. As shown in FIG. 12, door 128 includes upper rail ridges 1201, a lock stopper 1202, a hole 1203, and a cavity 1204 for mating with corresponding parts of module 120. Dashed line 1205 shows an axis of rotation of door 128 upon insertion of module 120.

Figure 13:
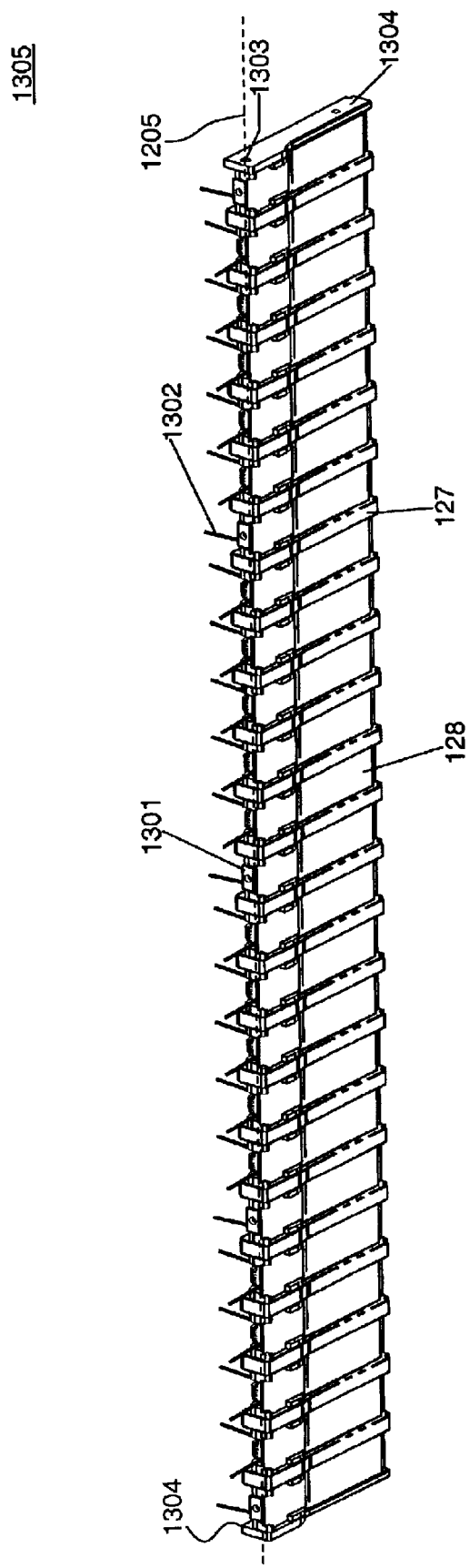
FIG. 13 illustrates how multiple doors are assembled in the chassis.

FIG. 13 illustrates additional detail of a door assembly 1305, which is mounted on the front of chassis 101. As shown in FIG. 13, door assembly 1305 includes a plurality of doors 128, separated by spacers 127. On either side of door assembly 1305, there are end spacers 1304. For each door 128, a spring 1302 acts to keep it biased towards a closed state, to prevent entry of dust and other debris. A bracket 1301 is used to couple springs 1302 to door assembly 1305. A circular rod 1303 is used to mount the springs 1302 and to link all doors 128 and spacers 127 together. End spacers 1304 and spacers 127 may be formed, for example, from metal or thermoplastic.

Door 128 is normally in a closed position until module 120 is inserted to open it Then door 128 serves as an upper rail, in addition to rail plate 1101, to guide module 120 to mating correctly with the multi-pin connector 460 of rear PCB assembly 440. Upon withdrawal of module 120, spring 1302 will force door 128 back to a closed position. Thus, door 128 prevents dust and other debris from entering the interior of chassis 101 and causing contamination to internal components. As compared to a side-mounted door assembly, the vertical door design allows higher module density with the same chassis size, e.g., either 19" or 23" wide chassis.

Figure 14:
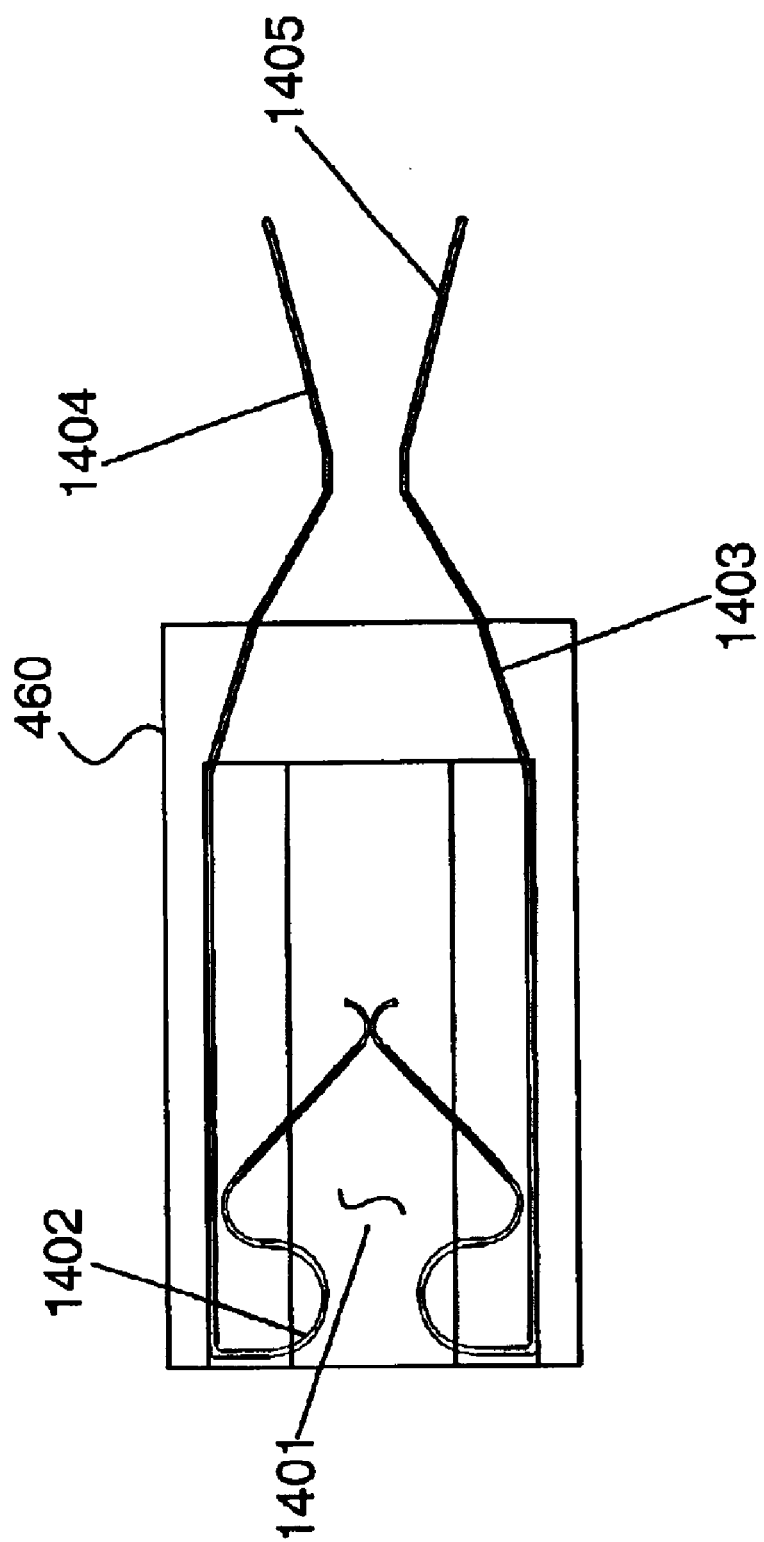
FIG. 14 illustrates a cross-section of a make-before-break connector.

FIG. 14 shows a cross-section of connector 460. The connector shown in FIG. 14 is a make-before-break type connector. Connector 460 may also be a pin-and-socket type, which may be more reliable, and provide better performance, but would result in higher cost.

In operation, when removable portion 480 is coupled to fixed portion 440 via edge connector 460, the electrical connections creating the cross-connect that were previously made by edge connector 460 (e.g., contacts 1402, 1403) are instead made by switches 505A and 505B. That is, when edge 506 of PCB 310 is inserted into cavity 1401 of connector 460, contacts 1402, 1403 are forced apart, breaking the electrical connection between conductors 1404 and 1405. This permits the signals from BNC jacks 220 and the connections made therebetween to be accessible at the front of removable portion 480. (See FIGS. 16–17.)

Referring back to FIGS. 1 and 2, chassis 101 populated with modules 120 can be used in a telephone company central office to connect telephone company equipment. In this environment, the equipment is connected to BNC jacks 220 at the rear of chassis 101. The fixed portions 440 then provide the desired interconnections between the equipment To reduce cost, modules 120 will not be needed until signal access is desired for re-routing or monitoring. Accordingly, it is anticipated that chassis 101 will typically be configured with all of fixed portions 440 in position in chassis 101 prior to chassis 101 being shipped to a customer. Modules 120 can then be added or removed by a customer, as necessary.

Referring back to FIG. 1, note that chassis 101 includes a row of lighted, push-button switches 110 along the top edge of the front panel. One switch 110 corresponds to each module slot of chassis 101. Referring to FIG. 2, note that at the rear of chassis 101, there is row of tracer ports 230 and a row of tracer LEDs 210. A pair of tracer ports 230 and an LED 210 are also associated with each module slot of chassis 101.

Switches 110, ports 230 and LEDs 210 are used for troubleshooting cable runs by tracing cabling between equipment bays as is known in the art. For example, given a coaxial cable that connects a first module in a first chassis to a module in a second, remotely-located chassis, a tracer port 230 corresponding to the first module would typically be connected by a wire to a tracer port on the second, remotely-located module. Depressing switch 110 associated with the first module would then complete an electrical circuit that would (1) light an LED within switch 110 itself, (2) light rear panel LED 210 associated with the first module, and (3) light the remotely-located, rear panel LED associated with the second module. This facilitates the tracing of cabling by technicians for troubleshooting.

DSX chassis 101 of the present invention with cross-connect modules 120 installed provides signal crossing functions in digital networks located in a central cross connecting location for the ease of testing, monitoring, restoring and repairing the digital signals and associated equipment. Chassis 101 with BNC jacks 220 of fixed portions 440 preinstalled into chassis 101 can provide only crossing function capability. However, chassis 101 with removable module 120 installed can provide capabilities for testing, monitoring, and rerouting the digital signals as well as providing the normal crossing functionality.

Note that, when installed in a first orientation, module 120 permits front-panel access to the following signals: IN, OUT, MONITOR IN and MONITOR OUT. However, if module 210 is installed in a different orientation (i.e., rotated 180 degrees so that the MiniWECo jack 302 that was on the top is on the bottom after rotation), removable portion 480 permits front-panel access to the following signals: XIN, XOUT, MONITOR XIN and MONITOR XOUT. (See also electrical schematics of FIGS. 16–17.) This feature permits front panel access to all back-panel signals. Furthermore, signal access is achieved in a module size that is smaller that would be required to provide simultaneous access to back-panel signals, permitting a size savings in module 120 and chassis 101.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A modular cross-connect comprising:
   a chassis configured to receive a plurality of cross-connect modules therein and including a front face and a rear cover;
   a plurality of fixed portions of cross-connect modules mounted in the chassis such that rear facing connectors of each of the fixed portions extend outward from the rear cover of the chassis, each fixed portion further having a front-facing connector configured to mate with a rear-facing connector of a corresponding removable portion of a cross-connect module;
   a plurality of slots in the front face of the chassis, each slot being configured to receive a removable portion of a cross-connect module and to align a rear-facing connector of the removable portion of the cross-connect module for connection with a front-facing connector of the fixed portion of the cross-connect module; and
   a plurality of doors at the front face of the chassis, each door corresponding to one of the plurality of slots and being pivotally mounted for rotation about an axis parallel to a width of the chassis, wherein insertion of the removable portion of the cross-connect module into one of the plurality of slots will cause a corresponding one of the plurality of doors to pivot about the axis to permit entry of the removable portion of the cross-connect module into the chassis.

2. The modular cross-connect of claim 1, wherein each door includes a rail for guiding the module during insertion.

3. The modular cross-connect of claim 1, wherein the doors are mounted on a rod extending in a direction perpendicular to direction of insertion.

4. The modular cross-connect of claim 1, further including a rail plate with grooves for guiding the modules during insertion.

5. The modular cross-connect of claim 1, further including a plurality of printed circuit boards coupled to the connectors on the rear cover and aligned parallel to a direction of insertion of the modules.

6. The modular cross-connect of claim 1, wherein each module includes a release lever and a locking tab for coupling to a corresponding door.

7. The modular cross-connect of claim 1, wherein each module includes two release levers and two locking tabs for coupling to a corresponding door and to a rail plate mounted over the bottom plate.

8. The modular cross-connect of claim 1, further including an edge connector on the printed circuit board for engaging the module when the module is inserted, the connector having a chamfered edge.

9. The modular cross-connect of claim 8, wherein the edge connector is a multi-pin make-before-break connector.

10. The modular cross-connect of claim 1, wherein the modules may be inserted in two different orientations.

11. The modular cross-connect of claim 1, wherein the top housing assembly includes a printed circuit board assembly with a plurality of switches, each of the switches having an LED integrally mounted within it.

12. The modular cross-connect of claim 11, wherein the printed circuit board assembly includes a micro-strip line printed circuit board.

13. The modular cross-connect of claim 1, wherein each of the switches further includes a removable lens over the LED.

14. The modular cross-connect of claim 1, wherein each module includes a micro-strip line printed circuit board.

15. The modular cross-connect of claim 1, wherein the module includes a plurality of jacks on its front side, each jack including a strain relief.

16. A modular cross-connect comprising:
a chassis configured to receive a plurality of cross-connect modules and including a front face and a rear cover;
a plurality of slots in the front face of the chassis, each slot configured to receive a cross-connect module and to align the cross-connect module for connection with a connector coupled to the rear cover; and
a plurality of doors at the front face, each door corresponding to one of the plurality of slots and including a rail for guiding a corresponding module during insertion.

17. The modular cross-connect of claim 16, further including a rail plate with grooves for guiding the modules during insertion.

18. The modular cross-connect of claim 16, further including a plurality of printed circuit boards, each printed circuit board coupled to a corresponding connector of the plurality of connectors on the rear cover and aligned parallel to a direction of insertion of the modules.

19. The modular cross-connect of claim 18, wherein each printed circuit board comprises a multi-pin connector for engaging the module when one of the modules is inserted into a corresponding slot.

20. The modular cross-connect of claim 19, wherein the multi-pin connector is a multi-pin make-before-break connector.

21. The modular cross-connect of claim 16, wherein each module includes a release lever and a locking tab for coupling to a corresponding door.

22. The modular cross-connect of claim 16, wherein each module includes two opposed release levers and two opposed locking tabs for engaging a corresponding door and a rail plate mounted over the bottom plate.

23. The modular cross-connect of claim 16, wherein the modules may be inserted in two different orientations.

24. The modular cross-connect of claim 16, wherein each door is pivotable about an axis parallel to a width of the chassis.

25. The modular cross-connect of claim 16, wherein the connection between the cross-connect module and the connector coupled to the rear cover is an electrical connection.

26. A modular cross-connect comprising:
a cross-connect module;
a chassis including a front face and a rear cover;
a plurality of slots in the front face of the chassis, each slot configured to receive the cross-connect module and to align the cross-connect module for connection with a connector coupled to the rear cover; and
a plurality of connectors mounted on the rear cover,
wherein the cross-connect module includes a plurality of jacks on its front side, each jack including a circular ridge for strain relief, and
wherein the chassis includes a plurality of doors covering the plurality of slots, each door including a rail for guiding the module during insertion.

27. The modular cross-connect of claim 26, further including a plurality of printed circuit boards coupled to the connectors on the rear cover and aligned parallel to a direction of insertion of the modules.

28. The modular cross-connect of claim 26, wherein the modules may be inserted in two different orientations.

29. A modular cross-connect comprising:
a chassis defining a plurality of slots, each slot being configured to receive a cross-connect module; and
a plurality of cross-connect modules, each cross-connect module having a fixed portion and a corresponding removable portion,
each of the fixed portions having a printed circuit board with a plurality of rear-facing connectors and a front-facing connector, each fixed portion providing cross-connection for at least one pair of the rear facing connectors, wherein each fixed portion is mounted in a corresponding one of the slots of the chassis such that the rear-facing connectors extend outward from a rear portion of the chassis,
each removable portion having a printed circuit board with a rear-facing connector configured to mate with a front-facing connector of a corresponding one of the fixed portions upon insertion of the removable portion into one of the plurality of slots of the chassis and having at least one front-facing connector, wherein mating of one of the removable portions with a corresponding one of the fixed portions causes the cross-connection made by the fixed portion to be broken and re-made on the removable portion such that the front-facing connector of the removable portion may be used to break the re-made cross-connection for re-routing of a signal therefrom,
wherein insertion of one of the removable modules into one of the plurality of slots of the chassis in a first orientation will permit re-routing via the front-facing connector of the removable portion of a signal from a first one of the rear-facing connectors, and
wherein insertion of one of the removable modules into one of the plurality of slots of the chassis in a second orientation will permit re-routing via the front-facing connector of the removable portion of a signal from a second one of the rear-facing connectors.

30. The modular cross-connect of claim 29, wherein the chassis includes a plurality of doors, each door corresponding to one of the plurality of slots and being pivotally mounted for rotation about an axis parallel to a width of the chassis, wherein insertion of the removable portion of the cross-connect module into one of the plurality of slots will cause a corresponding one of the plurality of doors to pivot about the axis to permit entry of the removable portion of the cross-connect module into the chassis,
wherein each door includes a rail for guiding the module during insertion.

31. The modular cross-connect of claim 30, further including a rail plate with grooves, the rail plate mounted within the chassis for guiding the modules during insertion.

32. The modular cross-connect of claim 31, wherein each printed circuit board is aligned parallel to a direction of insertion of the modules.

33. The modular cross-connect of claim 32, wherein each removable portion includes a release lever and a locking tab for coupling to a corresponding door.

34. The modular cross-connect of claim 29, wherein each removable portion includes a plurality of jacks on its front side, each jack including strain relief.

35. A modular cross-connect comprising:
a chassis defining a plurality of slots, each slot configured to receive a cross-connect module;
a rail plate within the chassis, the rail plate having a plurality of rails, each rail corresponding to a slot;
a plurality of doors mounted to the chassis, each door providing access to a corresponding slot and having a rail thereon; and
a plurality of connectors mounted on a rear cover of the chassis,
wherein, upon insertion of a module into one of the slots, a corresponding rail of the rail plate and the rail of a corresponding one of the doors guide the module into the slot so that the module can connect to the connectors on the rear cover.

36. The modular cross-connect of claim 35, further including a plurality of printed circuit boards coupled to the connectors on the rear cover and aligned parallel to a direction of insertion of the modules.

37. The modular cross-connect of claim 35, further including the cross-connect module with two release levers and two locking tabs for engaging to a corresponding door and the rail plate.

38. The modular cross-connect of claim 37, wherein the cross-connect module may be inserted in two different orientations.

39. The modular cross-connect of claim 37, wherein the cross-connect module includes a plurality of jacks on its front side, each jack including a circular ridge for strain relief.

40. A modular cross-connect comprising:
a chassis configured to receive a plurality of cross-connect modules and including a front face and a rear cover;
a plurality of printed circuit boards mounted in the chassis such that rear-facing connectors of each printed circuit board extend outward from the rear cover of the chassis, the rear-facing connectors including an input connector, an output connector, a cross-input connector and a cross-output connector, each printed circuit board providing a first electrical connection between the input connector and the cross-input connector and providing a second electrical connection between the output connector and the cross-output connector;
a cross-connect module having at least two jacks on a front face and a rear-facing connector on a rear face; and
a plurality of slots in the front face of the chassis, each slot configured to receive the cross-connect module and to align the rear-facing connector of the cross-connect module for connection with a front-facing connector of a corresponding one of the plurality of printed circuit boards,
wherein mating of the cross-connect module with a corresponding one of the printed circuit boards causes the first and second electrical connections made by the circuit board to be broken and re-made on the cross-connect module,
wherein insertion of the cross-connect module into one of the plurality of slots of the chassis in a first orientation will permit re-routing, via one of the jacks on the front-face of the cross-connect module, of a signal from the input connector and re-routing, via another one of the jacks on the front-face of the cross-connect module, of a signal from the output connector, and
wherein insertion of the cross-connect module into one of the plurality of slots of the chassis in a second orientation will permit re-routing, via one of the jacks on the front-face of the cross-connect module, of a signal from the cross-input connector and re-routing, via another one of the jacks on the front-face of the cross-connect module, of a signal from the cross-output connector.

41. The modular cross-connect of claim 40, wherein the chassis includes a plurality of doors covering the plurality of slots, each door including a rail for guiding the module during insertion.

42. The modular cross-connect of claim 41, further including a rail plate with grooves for guiding the module during insertion.

43. The modular cross-connect of claim 42, wherein the module further comprises two release levers and two locking tabs for coupling to a corresponding one of the plurality of doors and to the rail plate.

44. The modular cross-connect of claim 40, further including a plurality of doors at the front face, each door corresponding to one of the plurality of slots and pivotable about an axis parallel to a width of the chassis upon insertion of the cross-connect module into one of the plurality of slots.

45. A modular cross-connect comprising:
a chassis configured to receive a plurality of cross-connect modules and including a front face and a rear cover;
a plurality of slots in the front face of the chassis, each slot configured to receive a cross-connect module and to align the cross-connect module for connection with a connector coupled to the rear cover; and
a plurality of doors at the front face, each door corresponding to one of the plurality of slots and pivotable about an axis parallel to a width of the chassis upon insertion of the cross-connect module into one of the plurality of slots.

46. The modular cross-connect of claim 45, further including a rear printed circuit board assembly removable from a front side of the chassis by inserting the cross-connect module into a desired slot, unfastening hex nuts from BNC connectors on the rear printed circuit board assembly and pulling the cross-connect module and the rear printed circuit board assembly out of the front side of the chassis.

47. A modular cross-connect comprising:
a chassis configured to receive a plurality of cross-connect modules and including a front face and a rear cover;
a plurality of printed circuit boards within the chassis, each printed circuit board including rear-facing connectors accessible through the rear cover and a front-facing connector within the chassis and electrically connected to the rear-facing connectors;
a plurality of slots in the front face of the chassis, each slot for insertion of a cross-connect module and for alignment of the cross-connect module for connection with the front-facing connector; and
a plurality of doors at the front face, each door corresponding to one of the plurality of slots and including a rail for guiding a corresponding module during insertion.

48. The modular cross-connect of claim 47, wherein the doors are pivotable about an axis parallel to a width of the chassis upon insertion of the corresponding cross-connect module into one of the plurality of slots.

49. The modular cross-connect of claim 48, further including a rail plate with grooves for guiding the modules during insertion.

50. The modular cross-connect of claim 47, wherein the modules may be inserted in two different orientations.

51. A modular cross-connect comprising:
- a chassis configured for insertion of a plurality of cross-connect modules and including a housing with a front face, a rear cover, a top cover and a bottom cover, the chassis also including a rail plate with grooves, the rail plate being mounted within the chassis;
- a plurality of printed circuit boards within the chassis, each printed circuit board including rear-facing connectors accessible through the rear cover and a front-facing connector within the chassis and electrically connected to the rear-facing connectors;
- a plurality of slots in the chassis for insertion of the cross-connect modules so that the cross-connect modules can engage the front-facing connectors upon insertion; and
- a plurality of doors mounted to pivot about an axis parallel to a width of the chassis upon insertion of the corresponding cross-connect module into one of the plurality of slots,
- wherein the grooves guide the cross-connect modules during insertion into the chassis.

52. The modular cross-connect of claim 51, wherein the front-facing connector is a multi-pin connector for engaging a corresponding cross-connect module when the corresponding cross-connect module is inserted into the chassis.

53. The modular cross-connect of claim 51, wherein the cross-connect modules may be inserted in two different orientations.

54. The modular cross-connect of claim 51, wherein each of the plurality of doors includes a rail for guiding the module during insertion.

* * * * *